US012407102B2

(12) United States Patent
Ma et al.

(10) Patent No.: US 12,407,102 B2
(45) Date of Patent: Sep. 2, 2025

(54) ANTENNA SYSTEM AND ELECTRONIC DEVICE

(71) Applicant: HUAWEI TECHNOLOGIES CO., LTD., Guangdong (CN)

(72) Inventors: Ning Ma, Shenzhen (CN); Ben Lai, Wuhan (CN); Dong Yu, Shanghai (CN); Pengfei Wu, Shanghai (CN); Yuan Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

(21) Appl. No.: 18/043,278

(22) PCT Filed: Aug. 2, 2021

(86) PCT No.: PCT/CN2021/110098
§ 371 (c)(1),
(2) Date: Feb. 27, 2023

(87) PCT Pub. No.: WO2022/042219
PCT Pub. Date: Mar. 3, 2022

(65) Prior Publication Data

US 2023/0335908 A1 Oct. 19, 2023

(30) Foreign Application Priority Data

Aug. 28, 2020 (CN) ......................... 202010884837.2

(51) Int. Cl.
*H01Q 5/35* (2015.01)
*H01Q 1/22* (2006.01)
*H01Q 1/24* (2006.01)

(52) U.S. Cl.
CPC ............ *H01Q 5/35* (2015.01); *H01Q 1/2291* (2013.01); *H01Q 1/245* (2013.01)

(58) Field of Classification Search
CPC ...... H01Q 9/0442; H01Q 1/2291; H01Q 1/48; H01Q 1/243; H01Q 1/245; H01Q 5/328;
(Continued)

(56) References Cited

U.S. PATENT DOCUMENTS

2014/0139380 A1* 5/2014 Ouyang ................ H01Q 5/314 343/702
2015/0084817 A1* 3/2015 Yong ...................... H01Q 5/335 343/702
(Continued)

FOREIGN PATENT DOCUMENTS

CN 104752833 A 7/2015
CN 108321495 B * 5/2020 .............. H01Q 1/22
(Continued)

OTHER PUBLICATIONS

International Search Report and Written Opinion in International Appln. No. PCT/CN2021/110098, mailed on Oct. 18, 2021, 18 pages (with English translation).
(Continued)

*Primary Examiner* — Dimary S Lopez Cruz
*Assistant Examiner* — Anna N Hamadyk
(74) *Attorney, Agent, or Firm* — Fish & Richardson P.C.

(57) ABSTRACT

An example antenna system includes a first antenna including a strip-shaped antenna radiator. The antenna radiator has a first end and a second end. At least one of a first radiator section in which the first end is located or a second radiator section in which the second end is located is used as a radiator of a second antenna. One of two first filters is connected between the first antenna radio frequency source and an antenna feed point, and the other first filter is connected between a ground and an antenna ground point. One of two second filters is connected between the second antenna radio frequency source and at least one of the first
(Continued)

radiator section or the second radiator section, and the other second filter is connected between the ground and at least one of the first radiator section or the second radiator section.

20 Claims, 13 Drawing Sheets

(58) Field of Classification Search
CPC ............ H01Q 5/335; H01Q 5/35; H01Q 9/42; H01Q 1/36; H01Q 1/22; H01Q 1/44; H01Q 1/50; H01Q 1/521; H01Q 21/0006; H01Q 21/30; H01Q 1/24; H01Q 1/241; H01Q 1/242; H01Q 23/00
See application file for complete search history.

(56) References Cited

U.S. PATENT DOCUMENTS

2016/0365621 A1* 12/2016 Yong ........................ H01Q 1/50
2017/0141470 A1* 5/2017 Yong ........................ H01Q 5/20

FOREIGN PATENT DOCUMENTS

CN 111193101 A 5/2020
CN 111276797 A * 6/2020 ............... H01Q 1/36

OTHER PUBLICATIONS

Extended European Search Report in European Appin. No. 21860059.1, mailed on Jan. 31, 2024, 9 pages.

* cited by examiner

ANTENNA SYSTEM AND ELECTRONIC DEVICE

CROSS REFERENCE TO RELATED APPLICATIONS

This application is a National Stage of International Patent Application No. PCT/CN2021/110098, filed on Aug. 2, 2021, which claims priority to Chinese Patent Application No. 202010884837.2 filed on Aug. 28, 2020, both of which are hereby incorporated by reference in their entireties.

TECHNICAL FIELD

This application relates to the field of antennas, and in particular, to an antenna system and an electronic device.

BACKGROUND

As a communication requirement of a terminal device continuously increases, a communication specification is increasingly high, for example, in 5G communication, and 4*4 MiMo (multiple input multiple output, English full name: "Multiple Input Multiple Output") of a Wi-Fi (wireless local area network, English full name: "Wireless Fidelity") antenna, and a quantity of antennas also continuously increases. However, due to a size limitation of the terminal device, it is difficult to lay out an antenna. In addition, the Wi-Fi antenna is prone to a result of a high directivity coefficient and a high 0 mm body SAR value, and consequently transmit power of the Wi-Fi antenna is limited and user experience is affected.

A SAR (specific absorption rate, English full name: "Specific Absorption Rate") refers to electromagnetic radiation energy absorbed by a substance of a unit mass in a unit time. Generally, a SAR value is internationally used to measure a thermal effect of radiation of the terminal device. The SAR value, as a most direct test value, indicates impact of radiation on a human body, such as the entire body, a body part, and limbs. The smaller the SAR value is, the less the radiation is absorbed. The 0 mm body SAR value indicates an average specific absorption rate of a user body when the Wi-Fi antenna directly touches the user body. At present, a technical standard for measuring electromagnetic radiation of the terminal device is formulated internationally, that is, to ensure safety of the terminal device, the SAR value of the terminal device needs to meet a requirement of a technical standard value. In this case, when the SAR value of the terminal device is relatively large, the transmit power of the Wi-Fi antenna of the terminal device needs to be greatly reduced to meet a requirement of the technical standard value. To ensure the transmit power of the Wi-Fi antenna of the terminal device, the SAR value of the Wi-Fi antenna of the terminal device needs to be reduced.

In addition, a technical standard for measuring a power spectral density ("PSD" for short, English full name: "Power Spectral Density") of the terminal device is further formulated internationally. To be specific, to ensure safety of the terminal device, a power spectral density value of the terminal device needs to meet a requirement of a technical standard value, that is, a power spectral density value of radiation of the Wi-Fi antenna of the terminal device needs to meet the requirement of the technical standard value. When a power spectral density of a wave is multiplied by an appropriate coefficient, power carried by each unit frequency wave is obtained, which is referred to as a power spectral density of a signal. The power spectral density is usually expressed in watts per hertz (W/Hz). A value of the power spectral density is related to the transmit power of the Wi-Fi antenna, and a value of radiation power of the Wi-Fi antenna in a direction. Therefore, a directivity coefficient of the Wi-Fi antenna needs to be reduced, to ensure the transmit power of the Wi-Fi antenna while ensuring that the power spectral density of radiation of the Wi-Fi antenna of the terminal device meets the technical standard value requirement.

In an existing terminal device, a first Wi-Fi antenna, a low-frequency antenna, and a second Wi-Fi antenna are sequentially disposed and spaced from each other in a circumferential direction of the terminal device. In other words, the low-frequency antenna, the first Wi-Fi antenna, and the second Wi-Fi antenna are disposed independently of each other. The first Wi-Fi antenna and the second Wi-Fi antenna each include a Wi-Fi antenna radiator, and the Wi-Fi antenna radiator has a Wi-Fi antenna teed point and a Wi-Fi antenna ground point. The Wi-Fi antenna feed point of the first Wi-Fi antenna is connected to a first Wi-Fi antenna radio frequency source, and the Wi-Fi antenna ground point of the first Wi-Fi antenna is connected to the ground. The Wi-Fi antenna feed point of the second Wi-Fi antenna is connected to a second Wi-Fi antenna radio frequency source, and the Wi-Fi antenna ground point of the second Wi-Fi antenna is connected to the ground. An operating frequency band of the low-frequency antenna is 0.7 GHz to 0.96 GHz, and an operating frequency band of the first Wi-Fi antenna and the second Wi-Fi antenna is 2.4 GHz to 2.5 GHz. In addition, operating frequencies of the first Wi-Fi antenna and the second Wi-Fi antenna are the same. It can be learned that, in this structure, the low-frequency antenna, the first Wi-Fi antenna, and the second Wi-Fi antenna are disposed independently of each other, and occupy relatively large space. This is not conducive to a miniaturization design of the terminal device.

Further, the following uses the first Wi-Fi antenna as an example to verify directional performance and SAR value performance of the first Wi-Fi antenna, and simulation analysis is performed by using full-wave electromagnetic simulation software HFSS, to obtain a radiation pattern of the first Wi-Fi antenna shown in FIG. 1 and a SAR value effect diagram shown in FIG. 2. In a simulation structure, only the first Wi-Fi antenna is disposed, that is, only a radiation pattern and a SAR value effect diagram when the first Wi-Fi antenna is separately disposed are tested, and an operating frequency of the first Wi-Fi antenna is 2.5 GHz. In addition, a length of the Wi-Fi antenna radiator of the first Wi-Fi antenna is $\frac{1}{4}\lambda$, where $\lambda$ is an operating wavelength of the first Wi-Fi antenna, and a distance between the Wi-Fi antenna feed point and the Wi-Fi antenna ground point of the first Wi-Fi antenna is 5 mm.

Refer to FIG. 1. A deeper grayscale indicates a higher field strength, and a part with a deepest gray scale indicates a highest field strength. It can be learned from FIG. 1 that most of electric fields generated by the first Wi-Fi antenna radiate toward a left side of the terminal device. In addition, in a simulation result, it is measured that the directivity coefficient of the first Wi-Fi antenna is 6.021 dBi. It can be learned that the directivity coefficient of the first Wi-Fi antenna is very high, reaching about 6.021 dBi.

Refer to FIG. 2. A deeper grayscale indicates a larger SAR value. A part shown in a dashed-line box in FIG. 2 indicates a distribution status of a SAR value simulation effect of the first Wi-Fi antenna. It can be learned from FIG. 3 that a SAR value of the first Wi-Fi antenna can reach 3.44 W/kg (to avoid loss of generality, in a simulation test of the SAR value, input power of the first Wi-Fi antenna is set to 17 dBmW, that is, 17 dBm). It can be learned that the SAR value of the first Wi-Fi antenna is very high, reaching about 3.44 W/kg.

In conclusion, in the existing terminal device, the low-frequency antenna and the Wi-Fi antenna are disposed independently of each other, and occupy relatively large space. This is not conducive to the miniaturization design of the terminal device. In addition, the directivity coefficient and the SAR value of the Wi-Fi antenna are both very large, and the transmit power of the Wi-Fi antenna is limited when the requirement of the internationally formulated technical standard is met. This affects user experience.

SUMMARY

An objective of this application is to resolve a problem in the conventional technology that a low-frequency antenna and a Wi-Fi antenna of a terminal device are disposed independently of each other, occupy relatively large space, and both a directivity coefficient and a SAR value of the Wi-Fi antenna are very high. Therefore, embodiments of this application provide an antenna system and an electronic device. A first antenna and a second antenna share a radiator, so that occupied space is reduced, and miniaturization of the electronic device is facilitated. In addition, a directivity coefficient and a SAR value of the second antenna are reduced, so that transmit power limitation of the second antenna is reduced and user experience is improved.

An embodiment of this application provides an antenna system, including a first antenna. The first antenna includes a strip-shaped antenna radiator, and the antenna radiator has an antenna feed point and an antenna ground point that are spaced in a length direction of the antenna radiator. The antenna feed point is connected to a first antenna radio frequency source, to receive a radio frequency signal output by the first antenna radio frequency source, and the antenna ground point is connected to a ground.

The antenna radiator has a first end and a second end, a first radiator section in which the first end is located and/or a second radiator section in which the second end is located each are/is used as a radiator of a second antenna, and a radio frequency signal whose frequency is higher than a frequency of the first antenna radio frequency source and that is output by a second antenna radio frequency source may be received by using the first radiator section and/or the second radiator section, so that the second antenna performs transmission outward, and the first radiator section and/or the second radiator section being connected to the ground.

A first filter is connected between the first antenna radio frequency source and the antenna feed point, and a first filter is connected between the ground and the antenna ground point, and the first filter is used to allow a signal of the first antenna to pass through, and prevent a signal of the second antenna from passing through. A second filter is connected between the second antenna radio frequency source and the first radiator section and/or the second radiator section, and a second filter is connected between the ground and the first radiator section and/or the second radiator section, and the second filter is used to allow the signal of the second antenna to pass through, and prevent the signal of the first antenna from passing through.

In this solution, the first antenna and the second antenna share a radiator, so that occupied space is reduced, antenna layout space is saved, and miniaturization of an electronic device is facilitated. In addition, the first filter that is used to allow the signal of the first antenna to pass through, and prevent the signal of the second antenna from passing through is separately connected between the first antenna radio frequency source and the antenna feed point of the first antenna, and between the ground and the antenna ground point of the first antenna, and the second filter that is used to allow the signal of the second antenna to pass through and prevent the signal of the first antenna from passing through is separately connected between the second antenna radio frequency source and the first radiator section and/or the second radiator section, and between the ground and the first radiator section/or the second radiator section. In this way, isolation between the first antenna and the second antenna can be ensured, so that the first antenna and the second antenna with high isolation are implemented in compact space.

In addition, the first radiator section in which the first end of the antenna radiator is located and/or the second radiator section in which the second end of the antenna radiator is located is used as the radiator of the second antenna, and the first radiator section and/or the second radiator section may receive the radio frequency signal output by the second antenna radio frequency source, so that the second antenna performs transmission outward. In this way, a directivity coefficient of the second antenna can be reduced, so that transmit power limitation of the second antenna is reduced and user experience is improved.

In some embodiments, the first antenna is a low-frequency antenna, the first antenna radio frequency source is a low-frequency antenna radio frequency source, and the first filter is a low-pass filter; and/or the second antenna is a high-frequency antenna, the second antenna radio frequency source is a high-frequency antenna radio frequency source, and the second filter is a high-pass filter.

In some possible embodiments, a frequency of the radio frequency signal output by the second antenna radio frequency source is higher than a frequency of a radio frequency signal output by the first antenna radio frequency source.

In some embodiments, the high-frequency antenna is a Wi-Fi antenna.

The first radiator section has a high-frequency antenna feed point, and the high-frequency antenna feed point is connected to the high-frequency antenna radio frequency source by using the high-pass filter. The second radiator section has a high-frequency antenna ground point, and the high-frequency antenna ground point is connected to the ground by using the high-pass filter.

In this solution, by using the foregoing structure, the radio frequency signal output by the high-frequency antenna radio frequency source can be directly fed to the first radiator section by using the high-frequency antenna feed point, and the second radiator section can be fed by using an antenna radiator located between the high-frequency antenna feed point and the high-frequency antenna ground point via the high-frequency antenna feed point, that is, distributed feeding is performed on the first radiator section and the first radiator section, so that the Wi-Fi antenna performs transmission outward. In this way, a directivity coefficient of the Wi-Fi antenna is further reduced, and the directivity coefficient of the Wi-Fi antenna can be reduced to 4.749 dBi, so that transmit power limitation of the Wi-Fi antenna is reduced and user experience is improved.

In some embodiments, the high-frequency antenna feed point is located at an end that is of the first radiator section and that is far away from the first end, and the high-frequency antenna ground point is located at an end that is of the second radiator section and that is far away from the second end.

In some embodiments, the high-frequency antenna ground point freely selects, by using a switch component, a branch of the high-pass filter connected to the ground and a branch of a high-pass filter connected to an output of another high-frequency antenna radio frequency source. In this way, based on a usage scenario of the antenna system, the second radiator section can be used as different antennas at different times. Specifically, when the switch component is switched to the branch of the high-pass filter connected to the ground, the second radiator section is used as a part of a radiator of a Wi-Fi antenna. In this way, a directivity coefficient of the Wi-Fi antenna can be reduced. When the switch component is switched to the branch of the high-pass filter connected to the output of the another high-frequency antenna radio frequency source, the second radiator section is used as a radiator of another Wi-Fi antenna. In this case, the two Wi-Fi antennas: The Wi-Fi antenna and the another Wi-Fi antenna may operate simultaneously.

In some embodiments, the switch component is a single-pole double-throw switch.

In some embodiments, the high-frequency antenna is a Wi-Fi antenna.

The first radiator section has a first high-frequency antenna feed point and a first high-frequency antenna ground point, the first high-frequency antenna feed point is located between the first high-frequency antenna around point and the first end, the first high-frequency antenna feed point is connected to an output of the high-frequency antenna radio frequency source by using the corresponding high-pass filter, and the first high-frequency antenna ground point is connected to the ground by using the corresponding high-pass filter.

The second radiator section has a second high-frequency antenna feed point and a second high-frequency antenna ground point, the second high-frequency antenna feed point is located between the second high-frequency antenna ground point and the second end, the second high-frequency antenna feed point is connected to a phase shifter by using the corresponding high-pass filter and then connected to the output of the high-frequency antenna radio frequency source, and the second high-frequency antenna ground point is connected to the ground by using the corresponding high-pass filter.

In this solution, by using the foregoing structure, a radio frequency signal output by the high-frequency antenna radio frequency source can be directly fed to the first radiator section by using the first high-frequency antenna feed point, and be directly fed to the second radiator section by using the second high-frequency antenna feed point, that is, distributed feeding is performed on the first radiator section and the first radiator section. In addition, the phase shifter can adjust a phase difference between signals fed to the first high-frequency antenna feed point and the second high-frequency antenna feed point to a required phase difference by using the phase shifter. In this way, a directivity coefficient of the Wi-Fi antenna can be reduced to a greater extent, and the directivity coefficient of the Wi-Fi antenna can be reduced to 4.359 dBi, so that transmit power limitation of the Wi-Fi antenna is further reduced and user experience is improved. In addition, an average SAR value of a whole body of the user when the Wi-Fi antenna directly touches the user body can be reduced, and the SAR value can be reduced to 1 W/kg.

In some embodiments, the first high-frequency antenna ground point is located at an end that is of the first radiator section and that is away from the first end, and the second high-frequency antenna ground point is located at an end that is of the second radiator section and that is away from the second end.

In some embodiments, the antenna system further includes a differential circuit and another high-frequency antenna radio frequency source, two input ends of the differential circuit are respectively connected to the output of the high-frequency antenna radio frequency source and an output of another high-frequency antenna radio frequency source, and an output end of the differential circuit is connected to the high-pass filter of the first high-frequency antenna feed point. The output of the high-frequency antenna radio frequency source and the output of the another high-frequency antenna radio frequency source are both connected to the phase shifter.

In this solution, the first radiator section and the second radiator section not only serve as radiators of a Wi-Fi antenna, but also serve as radiators of another Wi-Fi antenna. In this case, the two Wi-Fi antennas: The Wi-Fi antenna and the another Wi-Fi antenna may operate simultaneously. In addition, when performance of the Wi-Fi antenna is not affected, a directivity coefficient of the another newly added Wi-Fi antenna is relatively low; and the directivity coefficient is reduced to 3.998 dBi. In addition, a SAR value of the another Wi-Fi antenna is also relatively low, and the SAR value can be reduced to 2 W/kg. In this way, transmit power limitation of the another Wi-Fi antenna can be reduced, and user experience can be improved.

In some embodiments, the first high-frequency antenna feed point and the high-frequency antenna radio frequency source are connected by using a transmission line, and the second high-frequency antenna feed point and the high-frequency antenna radio frequency source are connected by using a transmission line.

In some embodiments, the antenna radiator is straight strip-shaped.

In some embodiments, lengths of the first radiator section and the second radiator section are both a quarter of an operating wavelength of the second antenna.

In some embodiments, an operating frequency range of the first antenna does not overlap an operating frequency range of the second antenna.

In some embodiments, when the first antenna is the low-frequency antenna, an operating frequency band of the low-frequency antenna is 0.7 GHz to 0.96 GHz.

When the second antenna is the high-frequency antenna, an operating frequency band of the high-frequency antenna is 2.4 GHz to 2.5 GHz.

In some embodiments, in the length direction of the antenna radiator, the antenna feed point is located between the antenna ground point and the end that is of the first radiator section and that is away from the first end.

In some embodiments, the antenna feed point and the antenna ground point are located in a middle part of the antenna radiator, and both the first radiator section and the second radiator section are located outside the middle part.

In some embodiments, in the length direction of the antenna radiator, the antenna feed point and the antenna ground point are respectively located on two sides of a center line of the antenna radiator.

An embodiment of this application further provides an electronic device, including a ground, and the electronic device further includes the antenna system provided in any one of the foregoing embodiments or the possible embodiments.

In some embodiments, the antenna radiator includes an outer bezel of the electronic device.

Alternatively, the antenna radiator uses a strip-shaped patch structure, and the strip-shaped patch structure is attached to a surface of an outer bezel of the electronic device and is made of a conductive material.

DESCRIPTION OF REFERENCE NUMERALS

Figure 1:
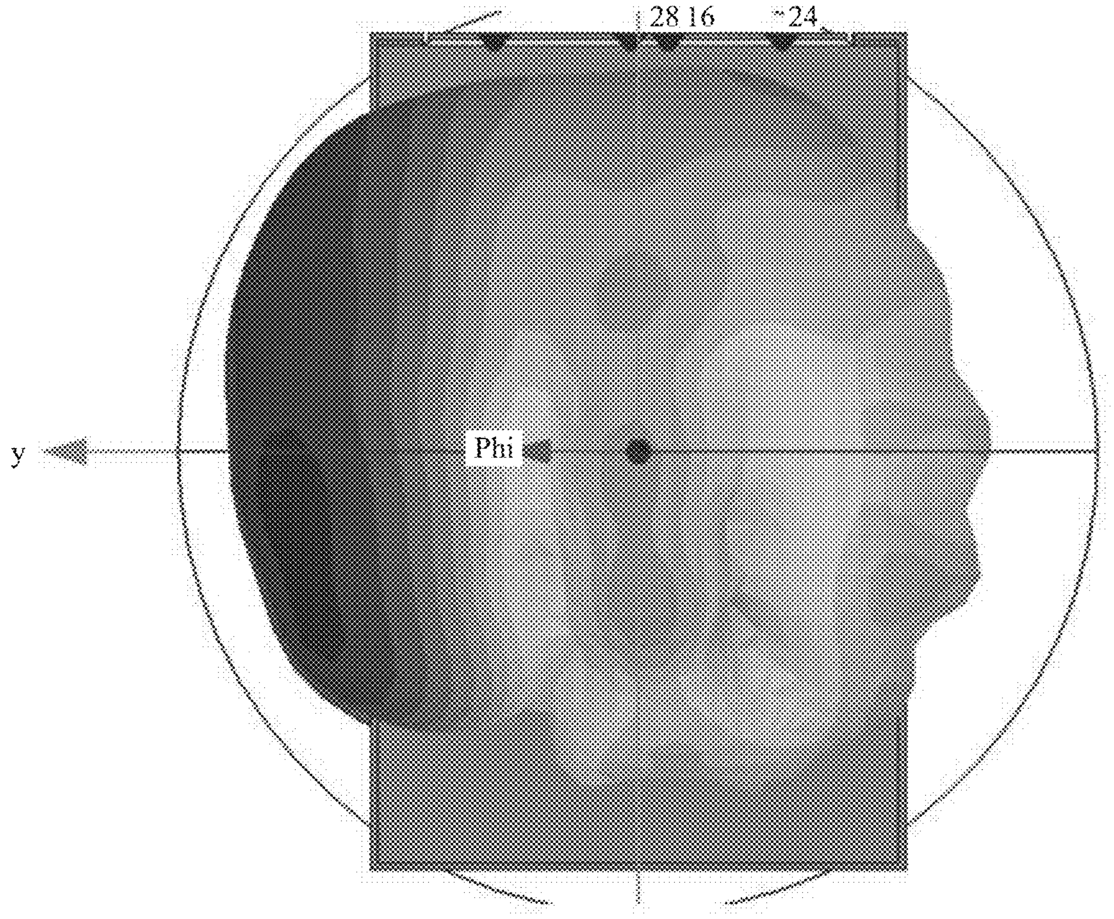
FIG. 1 is a radiation pattern of a first antenna of an existing electronic device, where an operating frequency of the Wi-Fi antenna is 2.5 GHz.
Figure 2:
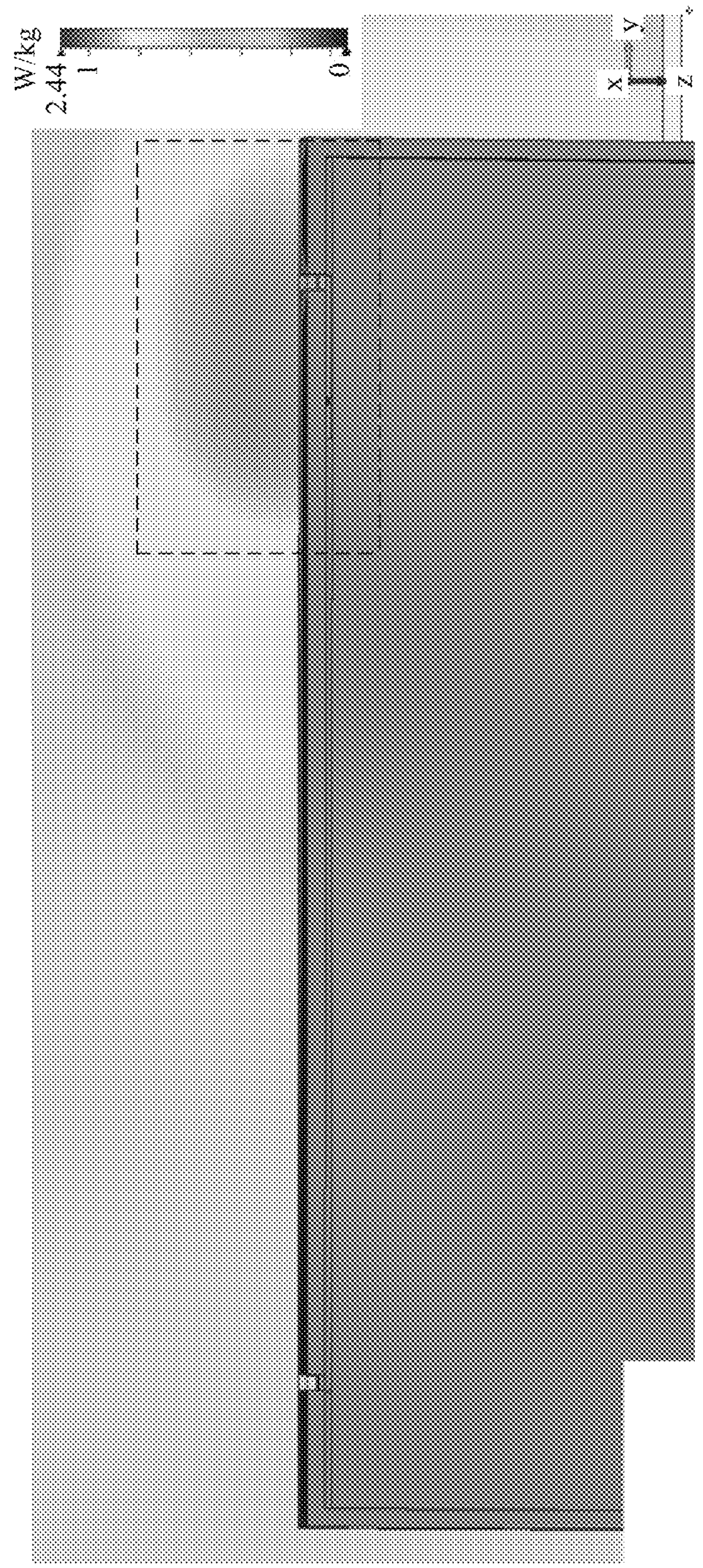
FIG. 2 is a simulation effect diagram of a SAR value of a first Wi-Fi antenna of an existing electronic device, where an operating frequency of the Wi-Fi antenna is 2.5 GHz.

100: electronic device;

200: ground;

300: low-frequency antenna; 310: low-frequency antenna radiator; 320: middle part; 330: first end; 332: second end; 340: low-frequency antenna feed point; 342: low-frequency antenna ground point; 350: first radiator section; 352: second radiator section;

400: Wi-Fi antenna; 410: high-frequency antenna feed point; 420: high-frequency antenna ground point;

500: low-frequency antenna radio frequency source; 510: high-frequency antenna radio frequency source;

600: low-pass filter; 610: high-pass filter;

100A: electronic device;

200A: ground;

350A: first radiator section; 352A: second radiator section;

420A: high-frequencv antenna ground point;

510A: high-frequency antenna radio frequency source; 520A: another high-frequency antenna radio frequency source;

610A: high-pass filter; 620A: another high-pass filter;

700A: switch component;

100B: electronic device;

200B: ground;

330B: first end; 332B: second end; 350B: first radiator section; 352B: second radiator section;

400B: Wi-Fi antenna; 410B: first high-frequency antenna feed point; 420B: first high-frequency antenna ground point; 430B: second high-frequency antenna feed point; 440B: second high-frequency antenna ground point;

510B: high-frequency antenna radio frequency source;

610B: high-pass filter;

700B: phase shifter;

800B: transmission line;

100C: electronic device;

350C: first radiator section; 352C: second radiator section;

400C: Wi-Fi antenna; 410C: first high-frequency antenna feed point; 430C: second high-frequency antenna feed point; 450C: another Wi-Fi antenna;

510C: high-frequency antenna radio frequency source; 520C: another high-frequency antenna radio frequency source;

610C: high-pass filter;

700C: phase shifter;

900C: differential circuit;

O: center line;

L: length direction of a low-frequency antenna radiator;

L1: length of a low-freqnency antenna radiator;

L2: length of a first radiator section;

L3: length of a second radiator section;

d1: distance between a low-frequency antenna feed point and a center line of a low-frequency antenna radiator;

d2: distance between a low-frequency antenna ground point and a center line of a low-frequency antenna radiator;

d3: distance between a first high-frequency antenna feed point and a first high-frequency antenna ground point;

d4: distance between a second high-frequency antenna feed point and a second high-frequency antenna ground point; and s: gap.

DESCRIPTION OF EMBODIMENTS

The following describes implementations of this application by using specific embodiments. A person skilled in the art may readily understand other advantages and functions of this application from the content disclosed in this specification. Although this application is described with reference to some embodiments, it does not mean that a characteristic of this application is limited only to this implementation. On the contrary, a purpose of describing this application with reference to an implementation is to cover another option or modification that may be derived based on claims of this application. To provide an in-depth understanding of this application, the following descriptions include a plurality of specific details. This application may be alternatively implemented without using these details. In addition, to avoid confusion or blurring a focus of this application, some specific details are omitted from the description. It should be noted that embodiments in this application and the features in embodiments may be mutually combined in the case of no conflict.

It should be noted that, in this specification, reference numerals and letters in the following accompanying drawings represent similar items. Therefore, once an item is defined in an accompanying drawing, the item does not need to be further defined or interpreted in subsequent accompanying drawings.

In descriptions of this application, it should be noted that orientation or location relationships indicated by terms "center", "above", "below", "left", "right", "vertical", "horizontal", "inner", "outer", and the like are orientation or location relationships based on the accompanying drawings, and are merely intended for conveniently describing this application and simplifying descriptions, rather than indicating or implying that an apparatus or an element in question needs to have a specific orientation or needs to be constructed and operated in a specific orientation, and therefore cannot be construed as a limitation on this application. In addition, terms "first" and "second" are merely intended for a descriptive purpose, and cannot be understood as indicating or implying relative importance.

In descriptions of this application, it should be noted that unless otherwise expressly specified and limited, terms "mount", "interconnect", and "connect" should be understood in a broad sense. For example, the terms may indicate a fixed connection, a detachable connection, or an integral connection; may be a mechanical connection or an electrical connection; or may be direct interconnection, indirect interconnection through an intermediate medium, or communication between the interiors of two elements. An ordinary technician in the art may understand specific meanings of the foregoing terms in this application based on a specific situation.

To make the objectives, technical solutions, and advantages of this application clearer, the following further describes implementations of this application in detail with reference to the accompanying drawings.

Embodiment

Figure 3:
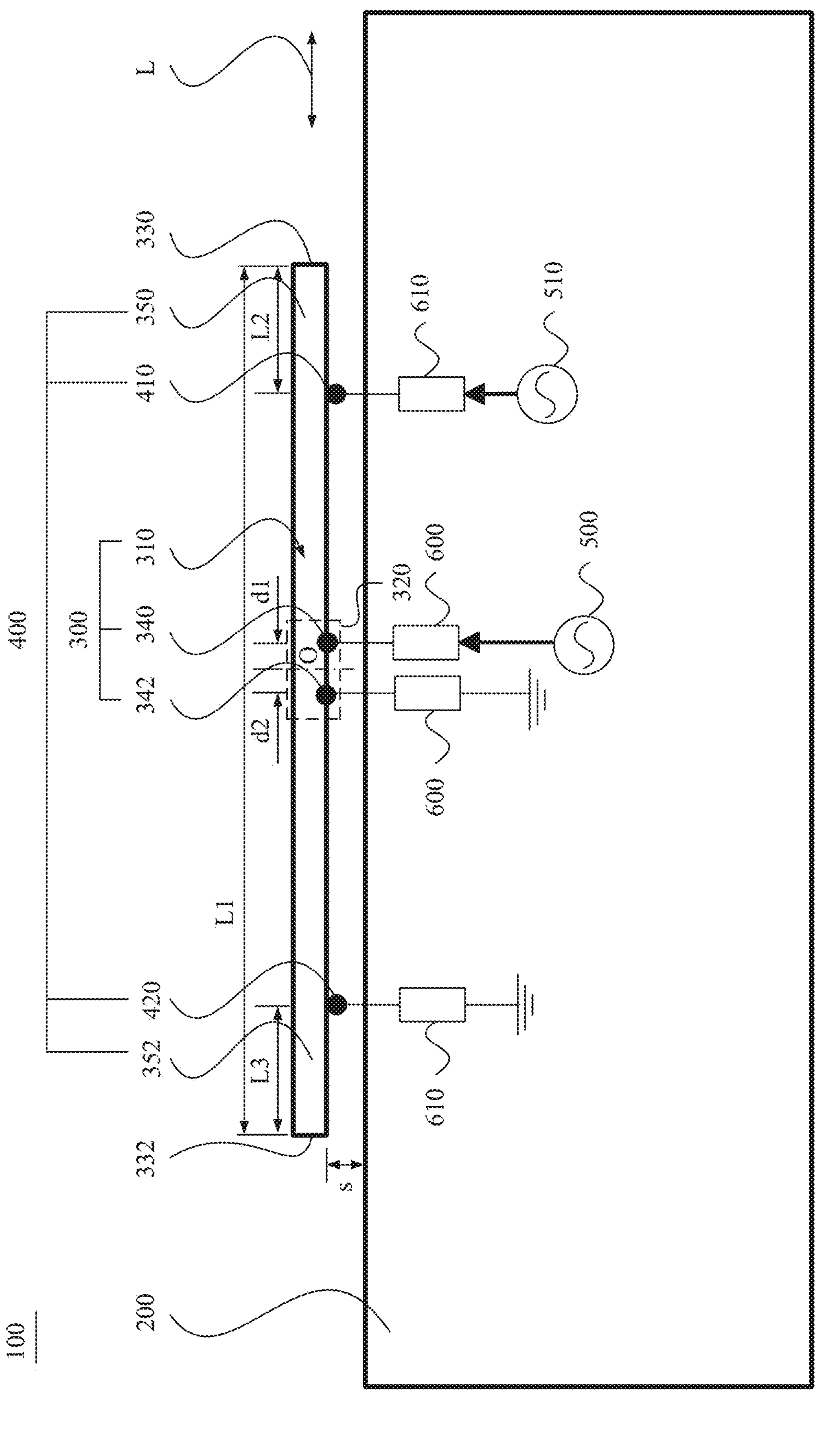
FIG. 3 is a schematic diagram of a partial structure of an electronic device according to Embodiment 1 of this application.

FIG. 3 is a schematic diagram of a partial structure of an electronic device 100 according to Embodiment 1 of this application. As shown in FIG. 3, an embodiment of this application provides an electronic device 100, including an antenna system, a ground 200, a low-frequency antenna radio frequency source 500, and a high-frequency antenna radio frequency source 510. In this implementation, the electronic device 100 is described by using a smartphone as an example. Certainly, a person skilled in the art may understand that in another alternative implementation, the electronic device 100 may alternatively be another electronic device such as a tablet computer or a smartwatch. This does not limit a protection scope of this application herein.

Refer to FIG. 3. The antenna system includes a low-frequency antenna 300 (corresponding to a first antenna) and a high-frequency antenna (corresponding to a second antenna). In this implementation, the first antenna is a low-frequency antenna 300, and the second antenna is a high-frequency antenna. Certainly, a person skilled in the art may understand that in another alternative implementation, the first antenna may alternatively be an antenna of another type, and is not limited to the low-frequency antenna, and the second antenna may alternatively be an antenna of another type, and is not limited to the high-frequency antenna, provided that an operating frequency band range of the first antenna is different from an operating frequency band range of the second antenna, that is, the operating frequency bands of the first antenna and the second antenna do not overlap.

An operating frequency of the low-frequency antenna 300 is lower than an operating frequency of the high-frequency antenna, and an operating frequency band range of the low-frequency antenna 300 is lower than an operating frequency band range of the high-frequency antenna. In this implementation, the high-frequency antenna is a Wi-Fi antenna 400. Certainly, a person skilled in the art may understand that, in another alternative implementation, the high-frequency antenna may alternatively be a high-frequency antenna of another type. The low-frequency antenna 300 is used for communication between the electronic device and a base station.

In this implementation, an operating frequency band of the low-frequency antenna 300 is 0.7 GHz to 0.96 GHz, and an operating frequency band of the Wi-Fi antenna 400 is 2.4 GHz to 2.5 GHz. Certainly, a person skilled in the art may understand that in another alternative implementation, the operating frequency band of the low-frequency antenna 300 and the operating frequency band of the Wi-Fi antenna 400 may alternatively use other suitable operating frequency bands.

As shown in FIG. 3, the low-frequency antenna 300 includes a strip-shaped low-frequency antenna radiator 310. In this implementation, the low-frequency antenna radiator 310 is straight strip-shaped. Certainly, a person skilled in the art may understand that, in another alternative implementation, the low-frequency antenna radiator 310 may alternatively use a bent or curved strip structure. In this implementation, a length of the low-frequency antenna radiator 310 is a quarter of an operating wavelength of the low-frequency antenna 300. An operating wavelength of the low-frequency antenna 300 is represented by $\lambda 1$.

The low-frequency antenna radiator 310 includes an outer bezel of the electronic device 100. Certainly, a person skilled in the art may understand that in another alternative implementation, the low-frequency antenna radiator 310 may alternatively be a metal sheet (for example, a steel sheet), or may be a flexible printed circuit (Flexible Printed Circuit, FPC for short), or may be formed in a form of LDS (Laser Direct Structuring, laser direct structuring), or may be a strip-shaped patch structure, where the strip-shaped patch structure is attached to a surface of the outer bezel of the electronic device and is made of a conductive material.

In addition, a middle part 320 (in this implementation, the middle part 320 is a part shown by a dashed box in FIG. 3) of the low-frequency antenna radiator 310 has a low-frequency antenna feed point 340 and a low-frequency antenna ground point 342 that are spaced in a length direction L of the low-frequency antenna radiator. The low-frequency antenna feed point 340 is connected to the low-frequency antenna radio frequency source 500, to receive a radio frequency signal output by the low-frequency antenna radio frequency source 500. The low-frequency antenna ground point 342 is connected to the ground 200. In addition, the low-frequency antenna radiator 310 and an outer edge of the ground 200 are spaced from each other, so that a gap is formed between the low-frequency antenna radiator 310 and the ground 200.

In this implementation, in the length direction L of the low-frequency antenna radiator, the low-frequency antenna feed point 340 and the low-frequency antenna ground point 342 are respectively located on two sides of a center line O of the low-frequency antenna radiator 310. Certainly, a person skilled in the art may understand that, in another alternative implementation, the low-frequency antenna feed point 340 and the low-frequency antenna ground point 342 may alternatively be located on a same side (for example, a left side or a right side of the center line O in FIG. 3) of the center line O of the low-frequency antenna radiator 310 and are close to the center line O.

In this implementation, the ground 200 may be formed by a rear cover of the electronic device 100. A person skilled in the art may understand that, in another alternative implementation, the ground 200 may alternatively be formed by other metal parts, for example, a printed circuit board and a bottom plate of a middle frame.

Refer to FIG. 3. The low-frequency antenna radiator 310 has a first end 330 and a second end 332, and a first radiator section 350 outside the middle part 320 in which the first end 330 is located and a second radiator section 352 outside the middle part 320 in which the second end 332 is located are used as a radiator of the Wi-Fi antenna 400. In other words, the first radiator section 350 and the second radiator section 352 are located outside the middle part 320, and a free end of the first radiator section 350 and a free end of the second radiator section 352 are respectively the first end 330 and the second end 332 of the low-frequency antenna radiator 310. In this implementation, in the length direction L of the low-frequency antenna radiator, the low-frequency antenna feed point 340 is located between the low-frequency antenna ground point 342 and an end that is of the first radiator section 350 and that is away from the first end 330.

The first radiator section 350 and/or the second radiator section 352 may receive a radio frequency signal output by the high-frequency antenna radio frequency source 510 whose frequency is higher than a frequency of the low-frequency antenna radio frequency source 500, so that the Wi-Fi antenna 400 performs transmission outward, and the first radiator section 350 and/or the second radiator section 352 is separately connected to the ground 200. In other words, a frequency of a radio frequency signal output by the high-frequency antenna radio frequency source 510 is higher than a frequency of a radio frequency signal output by the low-frequency antenna radio frequency source 500. In this implementation, lengths of the first radiator section 350 and the second radiator section 352 are both a quarter of an operating wavelength of the Wi-Fi antenna 400. An operating wavelength of the Wi-Fi antenna 400 is λ2.

In addition, a low-pass filter 600 is separately connected between the low-frequency antenna radio frequency source 500 and the low-frequency antenna feed point 340, and between the ground 200 and the low-frequency antenna ground point 342. The low-pass filter 600 allows a signal of the low-frequency antenna 300 to pass through, and prevents a signal of the Wi-Fi antenna 400 from passing through. A high-pass filter 610 is connected between the high-frequency antenna radio frequency source 510 and the first radiator section 350 and/or the second radiator section 352, and between the ground 200 and the first radiator section 350 and/or the second radiator section 352. The high-pass filter 610 allows the signal of the Wi-Fi antenna 400 to pass through, and prevents the signal of the low-frequency antenna 300 from passing through.

In this implementation, an existing low-pass filter in the conventional technology may be used as a low-pass filter, and an existing high-pass filter in the conventional technology may be used as a high-pass filter, which is not described herein again.

Certainly, it can be understood in this field that, the low-pass filter is an electronic filter apparatus that allows a signal whose frequency is lower than a cut-off frequency to pass through, but does not allow a signal whose frequency is higher than the cut-off frequency to pass through. A high-pass filter, also called a low-cut filter or low-impedance filter, allows a frequency higher than a cut-off frequency to pass through, and greatly attenuates a lower frequency.

In this embodiment, the low-frequency antenna 300 and the Wi-Fi antenna 400 share a radiator, so that occupied space is reduced, antenna layout space is saved, and miniaturization of the electronic device 100 is facilitated. In addition, the low-pass filter 600 is separately connected between the low-frequency antenna radio frequency source 500 and the low-frequency antenna feed point 340, and between the ground 200 and the low-frequency antenna ground point 342 to allow the signal of the low-frequency antenna 300 to pass through and prevent the signal of the Wi-Fi antenna 400 from passing through. The high-pass filter 610 is separately connected between the high-frequency antenna radio frequency source 510 and the first radiator section 350 and/or the second radiator section 352, and between the ground 200 and the first radiator section 350 and/or the second radiator section 352 to allow the signal of the Wi-Fi antenna 400 to pass through and prevent the signal of the low-frequency antenna 300 from passing through. In this way, isolation between the low-frequency antenna 300 and the Wi-Fi antenna 400 is ensured, to implement the low-frequency antenna 300 and the Wi-Fi antenna 400 with high isolation in compact space.

In addition, the first radiator section 350 outside the middle part 320 in which the first end 330 of the low-frequency antenna radiator 310 is located and/or the second radiator section 352 outside the middle part 320 in which the second end 332 is located is used as a radiator of the Wi-Fi antenna 400, and the first radiator section 350 and/or the second radiator section 352 may receive a radio frequency signal output by the high-frequency antenna radio frequency source 510 whose frequency is higher than a frequency of the low-frequency antenna radio frequency source 500, so that the Wi-Fi antenna 400 performs transmission outward. In this way, a directivity coefficient of the Wi-Fi antenna 400 can be reduced, so that transmit power limitation of the Wi-Fi antenna 400 is reduced, and user experience is improved.

Specifically, the first radiator section 350 has a high-frequency antenna feed point 410, and the high-frequency antenna teed point 410 may be connected to the high-frequency antenna radio frequency source 510 by using the high-pass filter 610. The second radiator section 352 has a high-frequency antenna ground point 420, and the high-frequency antenna ground point 420 may be connected to the ground 200 by using the high-pass filter 610. In this way, the radio frequency signal output by the high-frequency antenna radio frequency source 510 can be directly fed to the first radiator section 350 by using the high-frequency antenna feed point 410, and the second radiator section 352 can be fed by using the low-frequency antenna radiator 310 located between the high-frequency antenna feed point 410 and the high-frequency antenna ground point 420 via the high-frequency antenna feed point 410 that is, distributed feeding is performed on the first radiator section 350 and the second radiator section 352, so that the Wi-Fi antenna 400 performs transmission outward. In this way, a directivity coefficient of the Wi-Fi antenna 400 is further reduced, and the directivity coefficient of the Wi-Fi antenna 400 can be reduced to 4.749 dBi, so that transmit power limitation of the Wi-Fi antenna 400 is reduced and user experience is improved.

Further, the high-frequency antenna feed point 410 is located at an end that is of the first radiator section 350 and that is away from the first end 330, and the high-frequency antenna ground point 420 is located at an end that is of the second radiator section 352 and that is away from the second end 332. In the length L direction of the low-frequency antenna radiator, the low-frequency antenna feed point 340 and the low-frequency antenna ground point 342 are located between the high-frequency antenna feed point 410 and the high-frequency antenna ground point 420.

Figure 4:
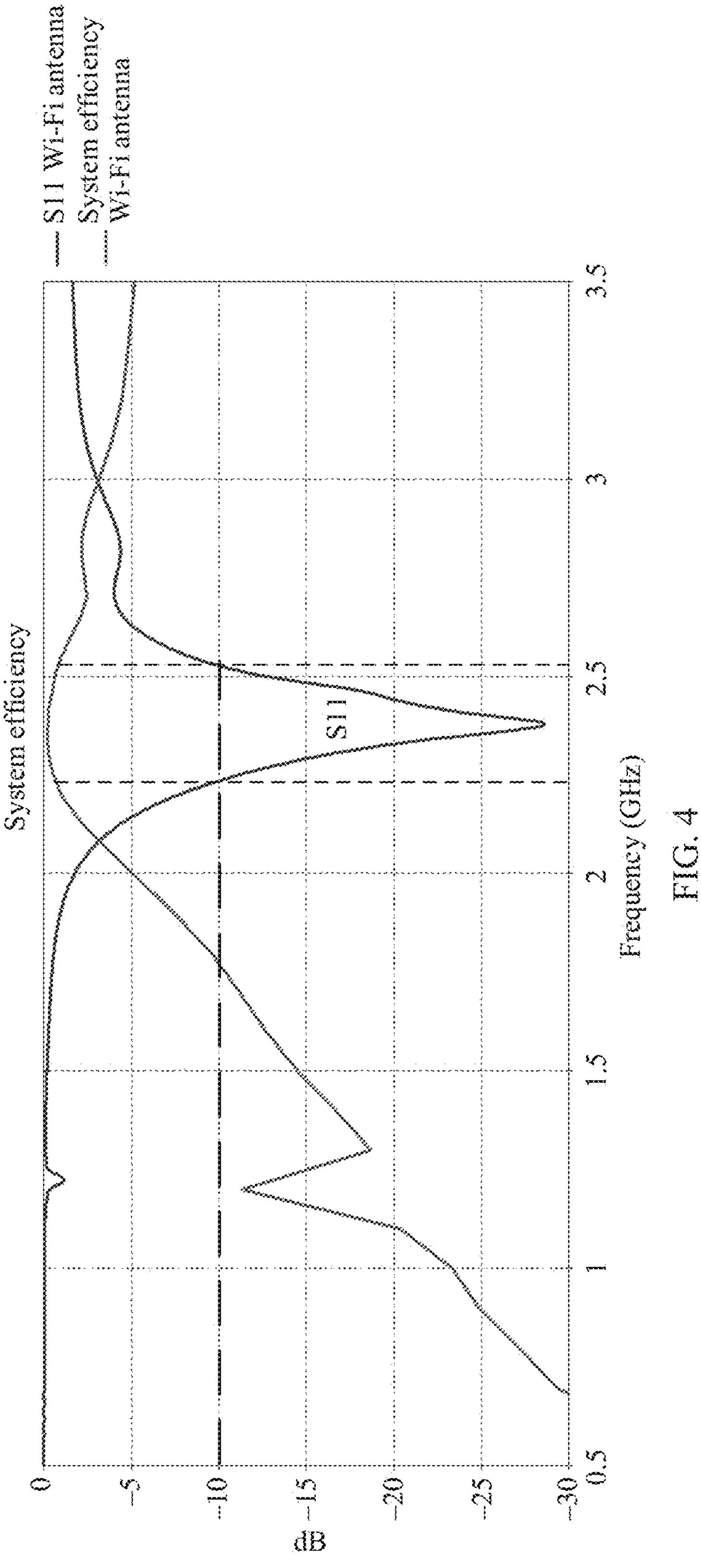
FIG. 4 is a simulation effect diagram of an S parameter and efficiency of a Wi-Fi antenna of an electronic device according to Embodiment 1 of this application.
Figure 5:
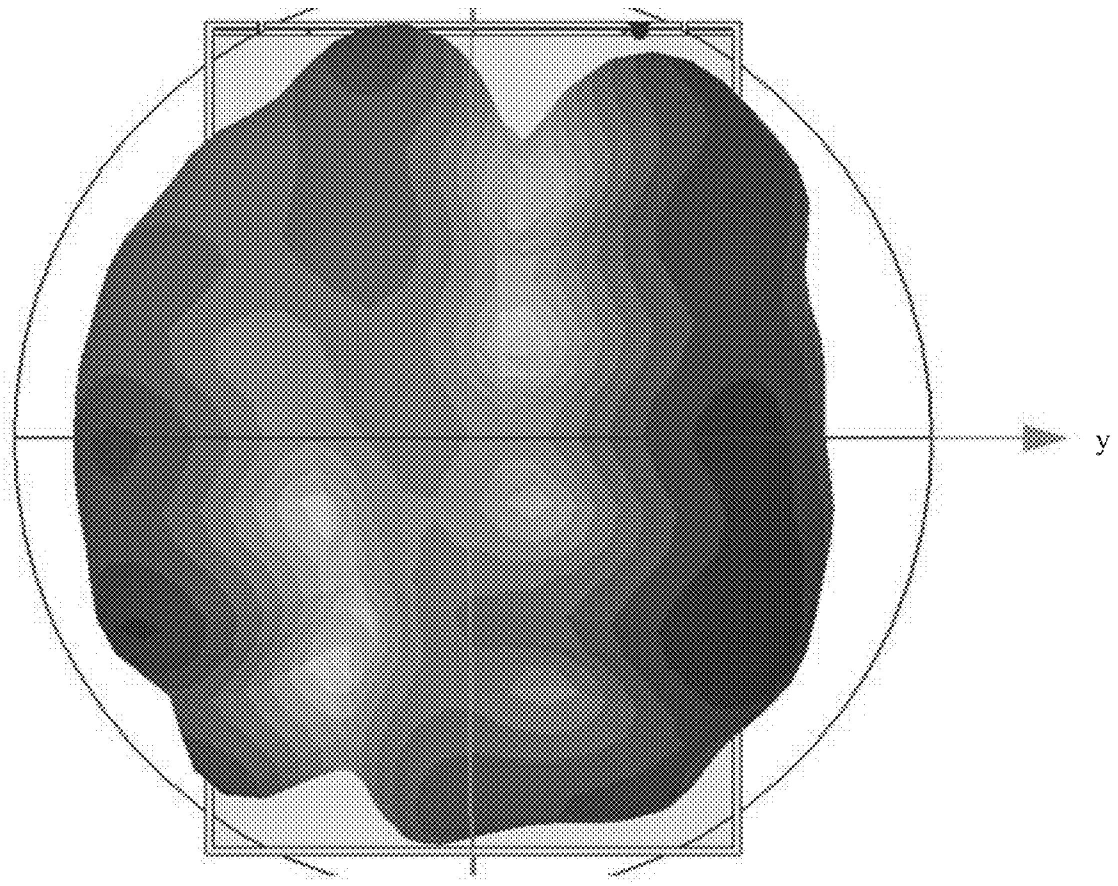
FIG. 5 is a radiation pattern of a Wi-Fi antenna of an electronic device according to Embodiment 1 of this application, where an operating frequency of the Wi-Fi antenna is 2.45 GHz.

The following specifically describes performance of a Wi-Fi antenna in an electronic device with reference to FIG. 4 and FIG. 5.

To verify directional performance of the Wi-Fi antenna in this embodiment of this application, full-wave electromagnetic simulation software HFSS is used to perform simulation analysis, so that simulation effect diagrams in FIG. 4 and FIG. 5 are obtained. In addition, the simulation effect is obtained when the low-frequency antenna works normally.

A simulation condition for obtaining the simulation effect diagrams shown in FIG. 4 and FIG. 5 is shown in Table 1 below (which is understood with reference to FIG. 3):

TABLE 1

| Parameter | Antenna system in Embodiment 1 of this application |
|---|---|
| Operating frequency of a Wi-Fi antenna | 2.45 GHz |
| Operating frequency of a low-frequency antenna | 0.83 GHz |
| Length L1 (mm) of a low-frequency antenna radiator | 90.36 (that is, ¼ λ1) |
| Length L2 (mm) of a first radiator section | 30.6 (that is, ¼ λ2) |
| Length L3 (mm) of a second radiator section | 30.6 (that is, ¼ λ2) |
| Distance d1 (mm) between a low-frequency antenna feed point and a center line of the low-frequency antenna radiator | 5 mm |
| Distance d2 (mm) between a low-frequency antenna ground point and a center line of the low-frequency antennaradiator | 5 mm |
| Gap s (mm) | 1.5 mm |

FIG. 4 is a simulation effect diagram of an S parameter and efficiency of a Wi-Fi antenna of an electronic device according to Embodiment 1 of this application. FIG. 5 is a radiation pattern of a Wi-Fi antenna of an electronic device according to Embodiment 1 of this application.

In FIG. 4, a horizontal coordinate represents a frequency in a unit of and a vertical coordinate respectively represents an amplitude value of S11 of the Wi-Fi antenna and system efficiency of the Wi-Fi antenna in a unit of dB. S11 is one of the S parameters. S11 indicates a reflection coefficient. This parameter indicates whether transmit efficiency of the antenna is high or not. A larger value indicates greater energy reflected by the antenna, and therefore the system efficiency of the Wi-Fi antenna is lower. The system efficiency of the Wi-Fi antenna is actual efficiency obtained after port matching of the antenna is considered, that is, the system efficiency of the Wi-Fi antenna is the actual efficiency of the Wi-Fi antenna. A person skilled in the art may understand that efficiency is generally represented by a percentage, and there is a corresponding conversion relationship between the efficiency and the dB, For example, if 50% of energy is radiated, the converted dB value is −3 dB, and if 90% of energy is radiated, the converted dB value is −0.046 dB. Therefore, the efficiency closer to 0 dB is higher.

It can be learned from FIG. 4 that, in a frequency band of 2.25 GHz to 2.57 GHz, the Wi-Fi antenna has relatively good impedance matching, that is, S11 is less than −10 dB. In other words, an operating frequency band of the Wi-Fi antenna covers 2.25 GHz to 2.57 GHz, that is, covers a frequency band of 2.4 GHz to 2.5 GHz. In other words, an absolute bandwidth of the −10 dB S11 of the Wi-Fi antenna is 0.32 GHz, and a relative bandwidth of the −10 dB S11 of the Wi-Fi antenna is 13.3%, so that the Wi-Fi antenna features a moderate bandwidth.

It can also be learned from FIG. 4 that the Wi-Fi antenna in the operating frequency band of 2.25 GHz to 2.57 GHz has system efficiency of −0.8 dB to −0.2 dB, and has good port impedance matching.

FIG. 5 shows a radiation pattern of a Wi-Fi antenna when an operating frequency is 2.45 GHz. Refer to FIG. 5. A deeper grayscale indicates a higher field strength, and a part with a deepest grayscale indicates a highest field strength. It can be learned from FIG. 5 that radiation energy of the Wi-Fi antenna in all directions of the electronic device is relatively uniform, and a directivity coefficient of the Wi-Fi antenna is reduced to 4.749 dBi. In other words, energy radiated in all directions of the Wi-Fi antenna is relatively uniform, and is not concentrated in an angle direction.

Embodiment 2

Figure 6:
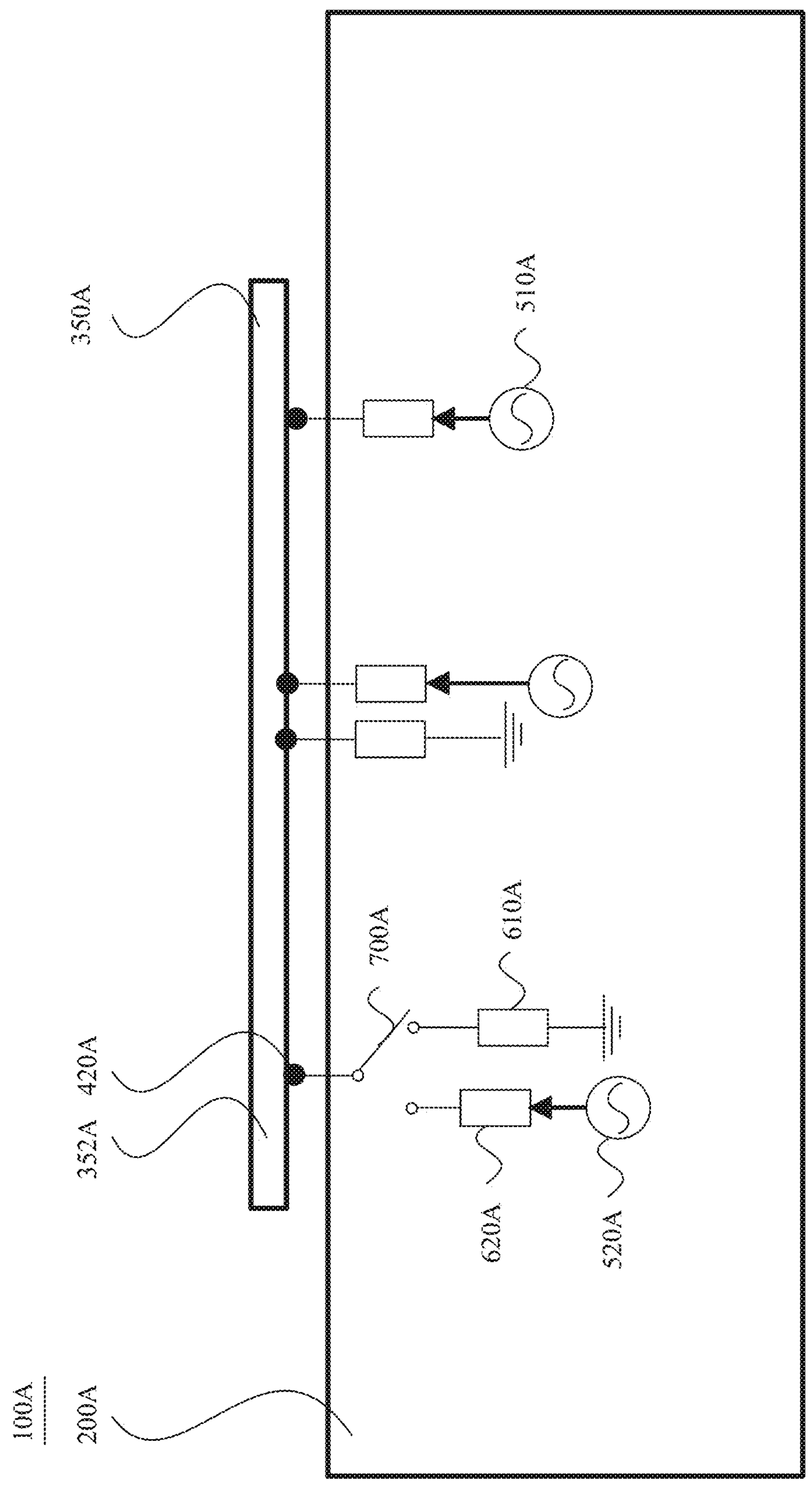
FIG. 6 is a schematic diagram of a partial structure of an electronic device according to Embodiment 2 of this application.

FIG. 6 is a schematic diagram of a partial structure of an electronic device 100A according to Embodiment 2 of this application. As shown in FIG. 6, compared with the structure of the electronic device 100 provided in Embodiment 1, a structure of the electronic device 100A in this embodiment is basically the same. The difference lies in that a high-frequency antenna ground point 420A freely selects, by using a switch component 700A, a branch of a high-pass filter 610A connected to a ground 200A and a branch of another high-pass filter 620A connected to an output of another high-frequency antenna radio frequency source 520A. In this implementation, the switch component 700A uses a single-pole double-throw switch.

By disposing the switch component 700A, based on a usage scenario of an antenna system, a second radiator section 352A can be used as different antennas at different times.

Specifically, when the switch component 700A is switched to the branch of the high-pass filter 610A connected to the ground 200A, the second radiator section 352A is used as a part of a radiator of a Wi-Fi antenna, and the first radiator section 350A is used as another part of the radiator of the Wi-Fi antenna. In this way, a directivity coefficient of the Wi-Fi antenna can be reduced.

When the switch component 700A is switched to the branch of another high-pass filter 620A connected to the output of the another high-frequency antenna radio frequency source 520A, the second radiator section 352A is used as a radiator of another Wi-Fi antenna, and the first radiator section 350A is used as a radiator of a Wi-Fi antenna. In this case, the two Wi-Fi antennas: The Wi-Fi antenna and the another Wi-Fi antenna may operate simultaneously.

In this implementation, a frequency of a radio frequency signal output by the another high-frequency antenna radio frequency source 520A is the same as a frequency of a radio frequency signal output by the high-frequency antenna radio frequency source 510A. In addition, an operating frequency band of the another newly added Wi-Fi antenna is the same as an operating frequency band of the Wi-Fi antenna.

Embodiment 3

Figure 7:
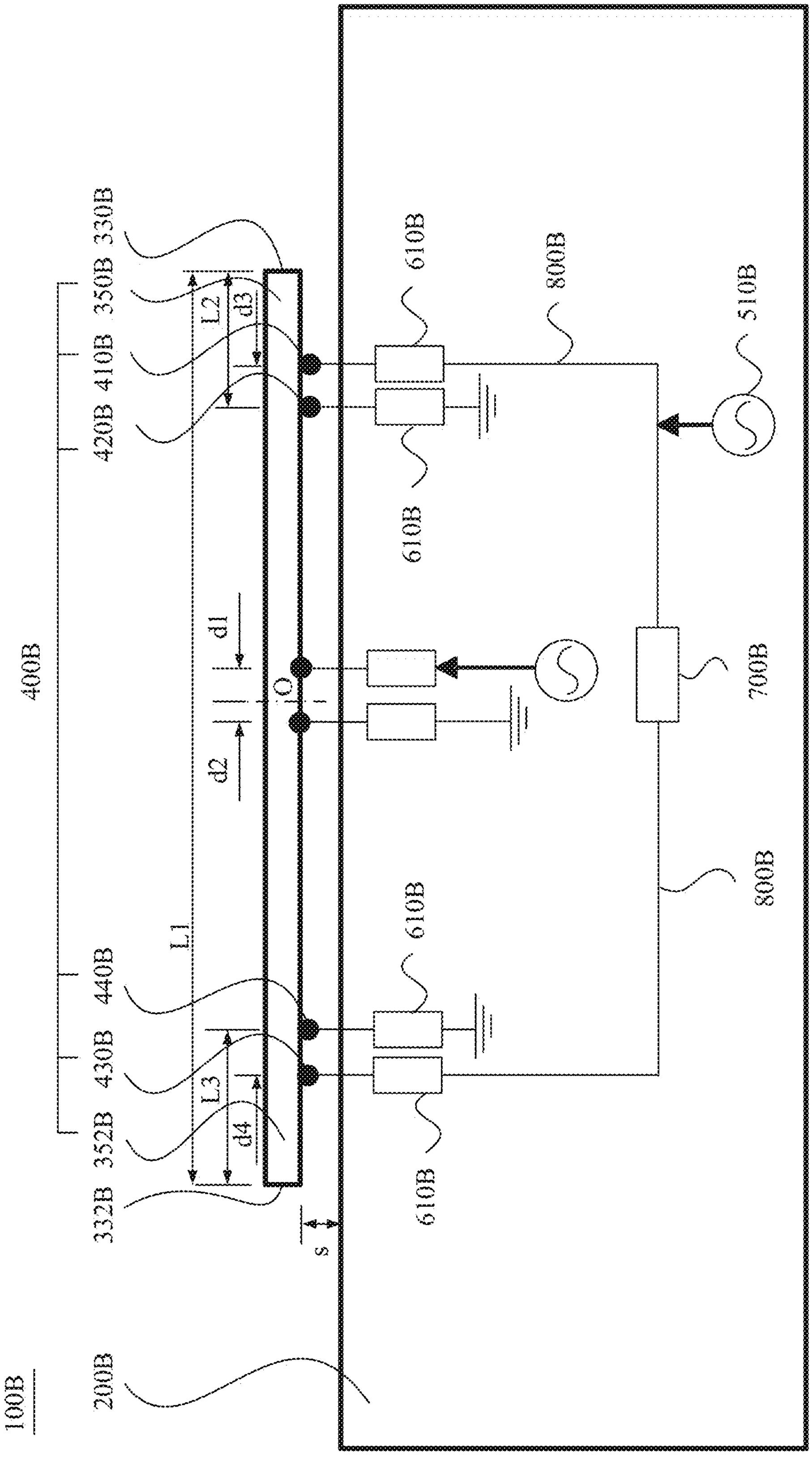
FIG. 7 is a schematic diagram of a partial structure of an electronic device according to Embodiment 3 of this application.

FIG. 7 is a schematic diagram of a partial structure of an electronic device 100B according to Embodiment 3 of this application. As shown in FIG. 7, compared with the structure of the electronic device provided in Embodiment 1, a structure of the electronic device 100B in this embodiment is basically the same. A difference lies in that a first radiator section 350B has a first high-frequency antenna feed point 410B and a first high-frequency antenna ground point 420B, and the first high-frequency antenna feed point 410B is located between the first high-frequency antenna ground point 420B and a first end 330B. The first high-frequency antenna feed point 410B is connected to an output of a high-frequency antenna radio frequency source 510B by using a corresponding high-pass filter 610B. The first high-frequency antenna ground point 420B is connected to a ground 200B by using the corresponding high-pass filter 610B.

A second radiator section 352B has a second high-frequency antenna feed point 430B and a second high-frequency antenna ground point 440B, and the second high-frequency antenna feed point 430B is located between the second high-frequency antenna ground point 440B and a second end 332B. The second high-frequency antenna feed point 430B is connected to a phase shifter 700B by using a corresponding high-pass filter 610B, and then is connected to an output of the high-frequency antenna radio frequency source 510B. The second high-frequency antenna ground point 440B is connected to the ground 200B by using the corresponding high-pass fitter 610B. A person skilled in the art may understand that a phase shifter is an apparatus that can adjust a phase of a wave. In this implementation, the phase shifter may be an existing known phase shifter, and details are not described herein.

In this application, a radio frequency signal output by the high-frequency antenna radio frequency source 510B can be directly fed to the first radiator section 350B by using the first high-frequency antenna feed point 410B, and directly fed to the second radiator section 352B by using the second high-frequency antenna feed point 430B, that is, distributed feeding is performed on the first radiator section 350B and the second radiator section 352B. In addition, the phase shifter 700B can adjust a phase difference of signals fed to the first high-frequency antenna feed point 410B and the second high-frequency antenna feed point 430B to a required phase difference, so that a directivity coefficient of the Wi-Fi antenna 400B can be reduced to a greater extent. The directivity coefficient of the Wi-Fi antenna 400B can be reduced to 4.359 dBi, so that transmit power limitation of the Wi-Fi antenna 400B is further reduced and user experience is improved. In addition, an average SAR value of a whole body of the user when the Wi-Fi antenna 400B directly touches the user body can be reduced, and the SAR value can be reduced to 1 W/kg.

In this implementation, the first high-frequency antenna ground point 420B is located at an end that is of the first radiator section 350B and that is away from the first end 330B, and the second high-frequency antenna ground point 440B is located at an end that is of the second radiator section 352B and that is away from the second end 332B.

Further, the first high-frequency antenna feed point 410B and the high-frequency antenna radio frequency source 510B, and the second high-frequency antenna feed point 430B and the high-frequency antenna radio frequency source 510B are respectively connected by using a transmission line 800B. In this implementation, the transmission line may be a microstrip. Certainly, a person skilled in the art may understand that, in another alternative implementation, the transmission line may alternatively be a transmission line of another type.

Figure 8:
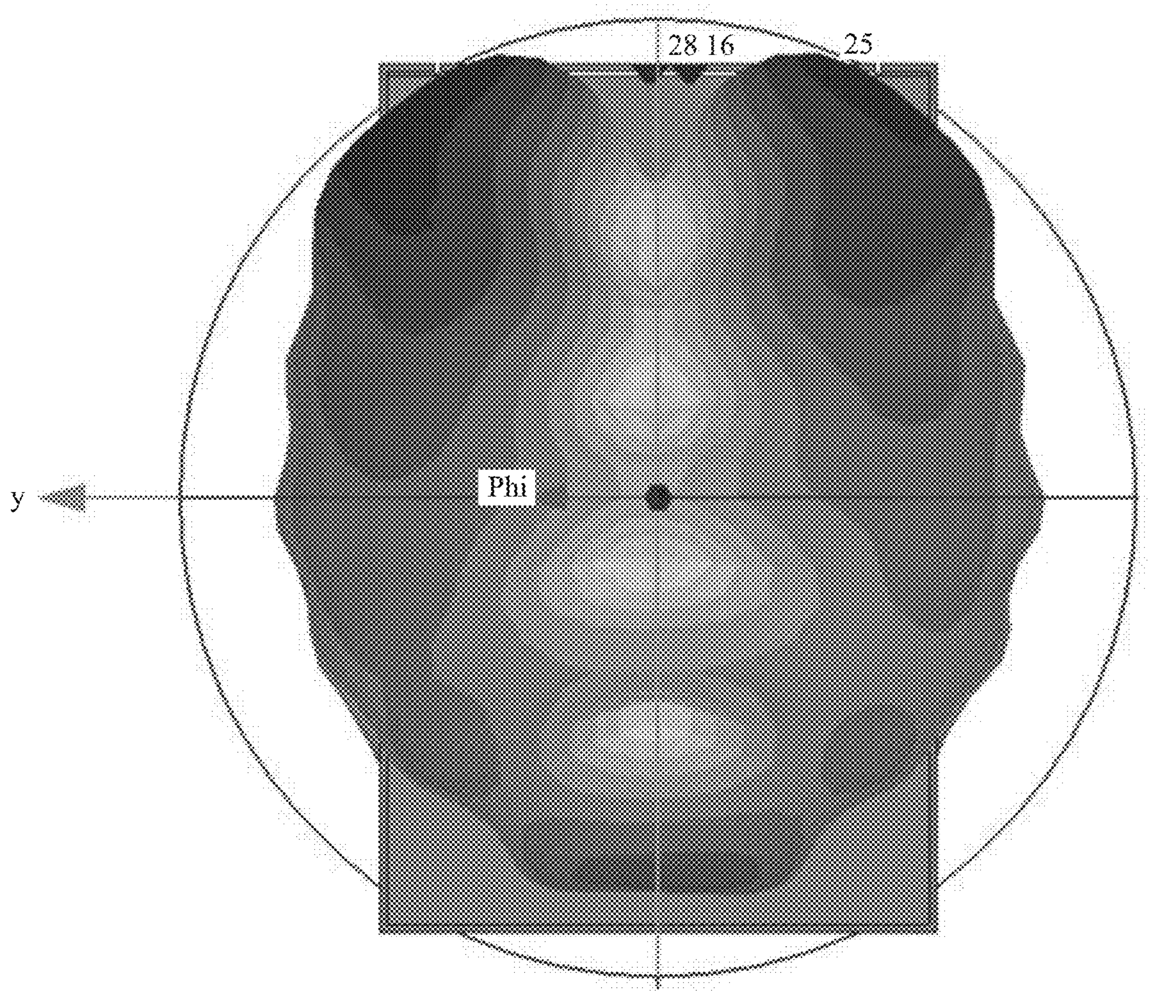
FIG. 8 is a radiation pattern of a Wi-Fi antenna of an electronic device according to Embodiment 3 of this application, where an operating frequency of the W-Fi antenna is 2.4 GHz.
Figure 9:
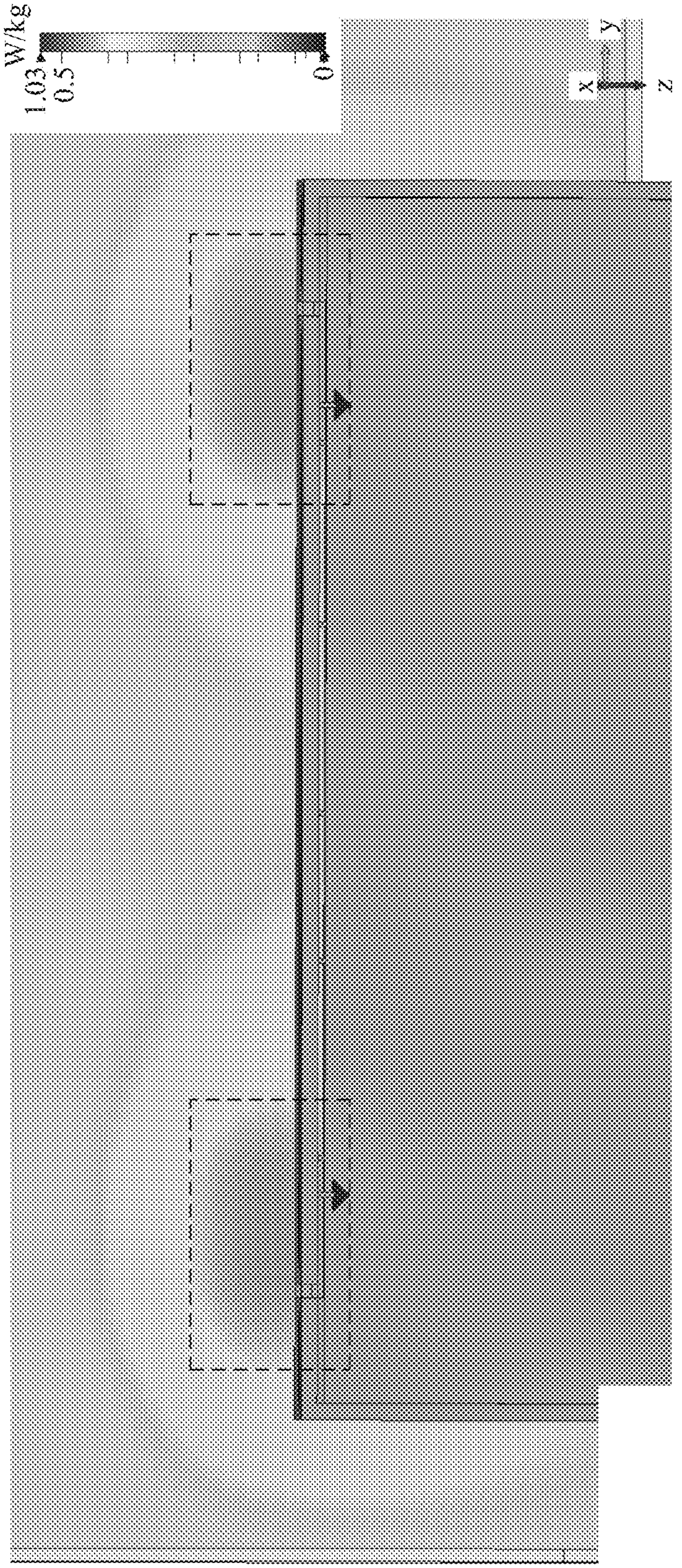
FIG. 9 is a simulation effect diagram of a SAR value of a Wi-Fi antenna of an electronic device according to Embodiment 3 of this application, wherein an operating frequency of the Wi-Fi antenna is 2.45 GHz.

The following specifically describes performance of a Wi-Fi antenna in an electronic device with reference to FIG. 8 and FIG. 9.

To verify directional performance and a SAR value characteristic of the Wi-Fi antenna in this embodiment of this application, full-wave electromagnetic simulation software HFSS is used to perform simulation analysis, so that simulation effect diagrams in FIG. 8 and FIG. 9 are obtained. In addition, the simulation effect is obtained when the low-frequency antenna works normally.

A simulation condition for obtaining the simulation effect diagrams shown in FIG. 8 and FIG. 9 is shown in Table 2 below (which is understood with reference to FIG. 7):

TABLE 2

| Parameter | Antenna system in Embodiment 3 of this application |
|---|---|
| Operating frequency of a low-frequency antenna | 0.83 GHz |
| Length L1 (mm) of a low-frequency antenna radiator | 90.36 |
| Length L2 (mm) of a first radiator section | 30.6 |
| Length L3 (mm) of a second radiator section | 30.6 |
| Distance d1 (mm) between a low-frequency antenna feed point and a center line of the low-frequency antenna radiator | 5 mm |
| Distance d2 (mm) between a low-frequency antenna ground point and a center line of the low-frequency antenna radiator | 5 mm |
| Distance d3 (mm) between a first high-frequency antenna feed point and a first high-frequency antenna ground point | 5 mm |
| Distance d4 (mm) between a second high-frequency antenna feed point and a second high-frequency antenna ground point | 5 mm |
| Gap s (mm) | 1.5 mm |

FIG. 8 is a radiation pattern of a Wi-Fi antenna of an electronic device according to Embodiment 3 of this application. An operating frequency of the Wi-Fi antenna is 2.4 GHz. FIG. 9 is a simulation effect diagram of a SAR value of a Wi-Fi antenna of an electronic device according to Embodiment 3 of this application. An operating frequency of the Wi-Fi antenna is 2.45 GHz.

FIG. 8 shows a radiation pattern of a Wi-Fi antenna when an operating frequency is 2.4 GHz. Refer to FIG. 8. A deeper grayscale indicates a higher field strength, and a part with a deepest grayscale indicates a highest field strength. It can be learned from FIG. 8 that radiation energy of the Wi-Fi antenna in all directions of the electronic device is relatively uniform, and a directivity coefficient of the Wi-Fi antenna is reduced to 4.359 dBi. In other words, energy radiated in all directions of the Wi-Fi antenna is relatively uniform, and is not concentrated in an angle direction.

Refer to FIG. 9. A deeper grayscale indicates a larger SAR value. A part shown in a dashed box in FIG. 9 represents a distribution status of simulation effects of SAR values at a first radiator section and a second radiator section of a Wi-Fi antenna. It can be learned from FIG. 9 that the SAR value of the Wi-Fi antenna can be reduced to 1 W/kg.

Embodiment 4

Figure 10:
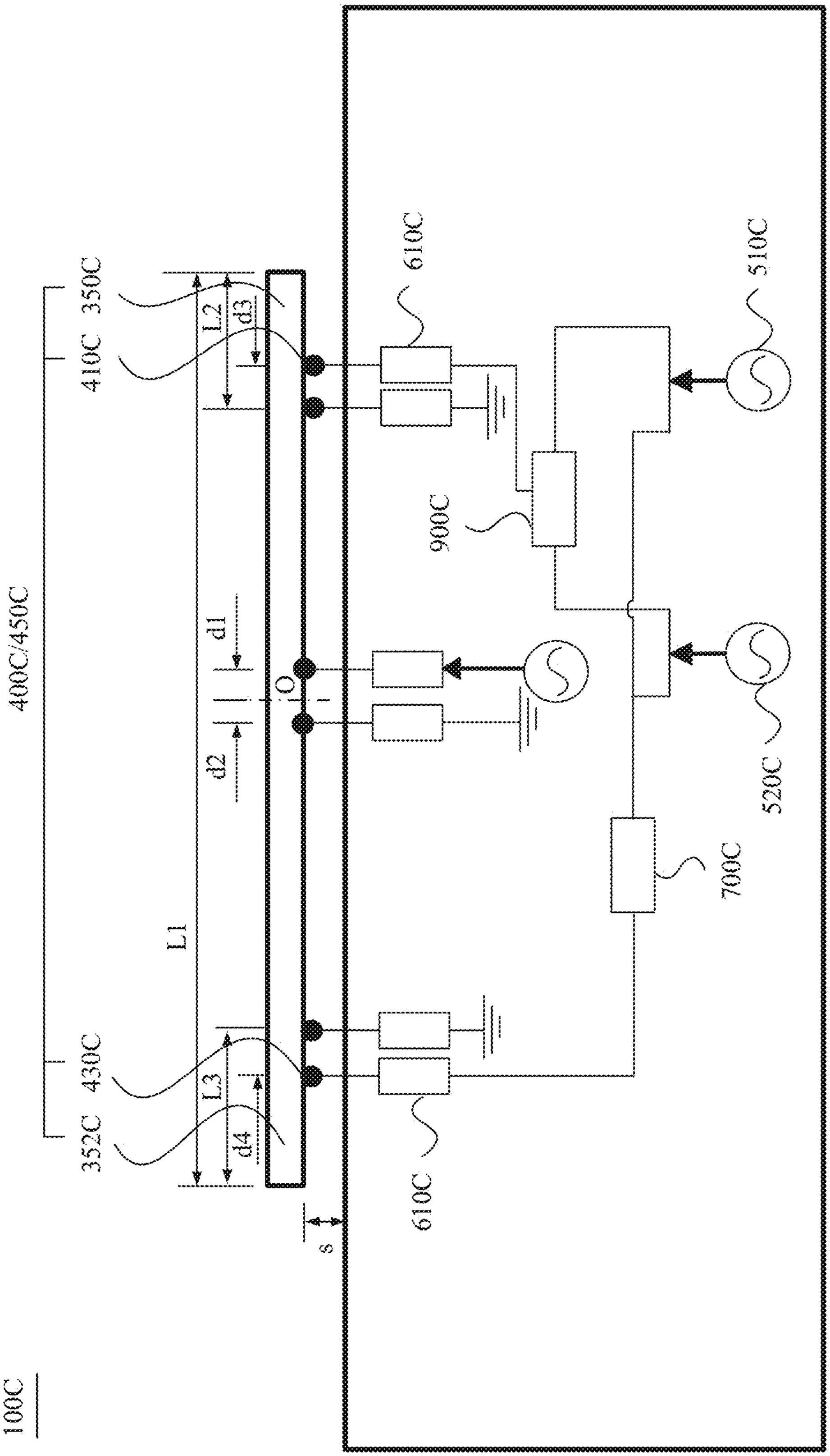
FIG. 10 is a schematic diagram of a partial structure of an electronic device according to Embodiment 4 of this application.

FIG. 10 is a schematic diagram of a partial structure of an electronic device 100C according to Embodiment 4 of this application. As shown in FIG. 10, compared with the structure of the electronic device 100B provided in Embodiment 3, a structure of the electronic device 100C in this embodiment is basically the same. A difference lies in that the electronic device 100C further includes a differential circuit 900C and another high-frequency antenna radio frequency source 520C, and two input ends of the differential circuit 900C are respectively connected to an output of a high-frequency antenna radio frequency source 510C and an output of the another high-frequency antenna radio frequency source 520C, an output end of the differential circuit 900C is connected to a high-pass filter 610C of a first high-frequency antenna feed point 410C, and the output of the high-frequency antenna radio frequency source 510C and the output of the another high-frequency antenna radio frequency source 520C are both connected to a phase shifter 700C. In this implementation, the differential circuit 900C uses a structure known in the conventional technology, and details are not described herein again. A signal fed to a second radiator section 352C by using the phase shifter 700C, the high-pass filter 610C, and a second high-frequency antenna feed point 430C is a superimposed signal of a radio frequency signal output by the high-frequency antenna radio frequency source 510C and a radio frequency signal output by the another high-frequency antenna radio frequency source 520C. An output end signal of the differential circuit 900C is a signal difference between the radio frequency signal output by the high-frequency antenna radio frequency source 510C and the radio frequency signal output by another high-frequency antenna radio frequency source 520C, that is, a phase-inverted superposed signal of the radio frequency signal output by the high-frequency antenna radio frequency source 510C and the radio frequency signal output by the another high-frequency antenna radio frequency source 520C.

One part of energy output by the high-frequency antenna radio frequency source 510C is fed to the second radiator section 352C by using the phase shifter 700C, the high-pass filter 610C, and the second high-frequency antenna feed point 430C, and the other part of energy is fed to the first radiator section 350C from one input end of the differential circuit 900C by using the high-pass filter 610C and the first high-frequency antenna feed point 410C through the differential circuit 900C. One part of energy output by the another high-frequency antenna radio frequency source 520C is fed to the second radiator section 352C by using the phase shifter 700C, the high-pass filter 610C, and the second high-frequency antenna feed point 430C, and the other part of energy is fed to the first radiator section 350C from the other input end of the differential circuit 900C by using the high-pass filter 610C and the first high-frequency antenna feed point 410C through the differential circuit 900C. The first radiator section 350C and the second radiator section 352C not only serve as radiators of a Wi-Fi antenna 400C, but also serve as radiators of another Wi-Fi antenna 450C. In this case, the two Wi-Fi antennas: The Wi-Fi antenna 400C and the another Wi-Fi antenna 450C may operate simultaneously. In addition, when performance of the Wi-Fi antenna 400C is not affected, a directivity coefficient of the another newly added Wi-Fi antenna 450C is relatively low, and the directivity coefficient is reduced to 3.998 dBi. In addition, a SAR value of the another Wi-Fi antenna 450C is also relatively low, and the SAR value can be reduced to 2 W/kg. In this way, transmit power limitation of the another Wi-Fi antenna 450C can be reduced, and user experience can be improved. The SAR value is an average SAR value of the whole body. When the high-frequency antenna radio frequency source 510C is in a non-working state, and the another high-frequency antenna radio frequency source 520C is in a working state, the directivity coefficient and the SAR value of the another antenna 450C may be separately tested. In addition, the high-frequency antenna radio frequency source 510C may excite the first radiator section 350C and the second radiator section 352C in a common mode signal mode, and the another high-frequency antenna radio frequency source 520C may excite the first radiator section 350C and the second radiator section 352C in a differential mode signal mode. Because isolation between a common mode signal and a differential mode signal is very high, isolation between the two Wi-Fi antennas is also very high.

In this implementation, a frequency of the radio frequency signal output by the another high-frequency antenna radio frequency source 520C is the same as a frequency of the radio frequency signal output by the high-frequency antenna radio frequency source 510C. In addition, an operating frequency band of the another newly added Wi-Fi antenna 450C is the same as an operating frequency band of the Wi-Fi antenna 400C.

Performance of a low-frequency antenna, a antenna, and another Wi-Fi antenna in an electronic device is specifically described below with reference to FIG. 11 to FIG. 13.

Figure 11:
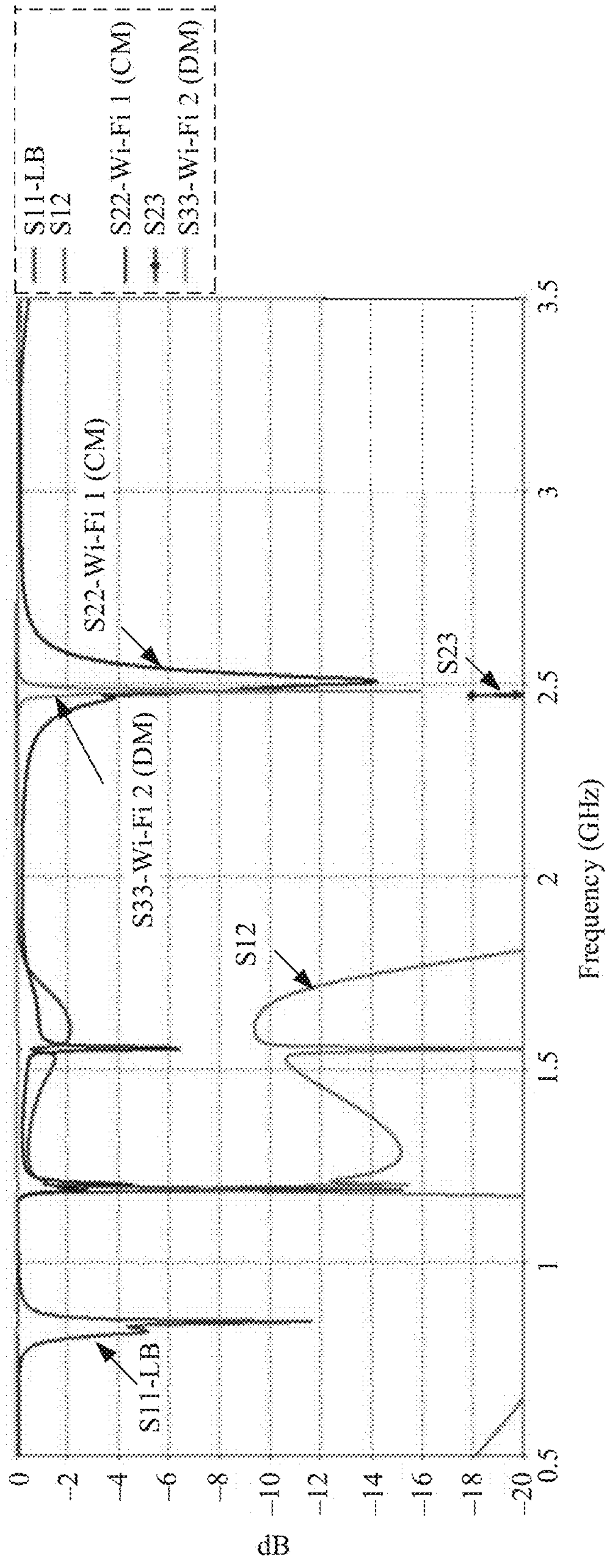
FIG. 11 is a simulation effect diagram of S parameters of a low-frequency antenna, a Wi-Fi antenna, and another Wi-Fi antenna of an electronic device according to Embodiment 4 of this application.
Figure 12:
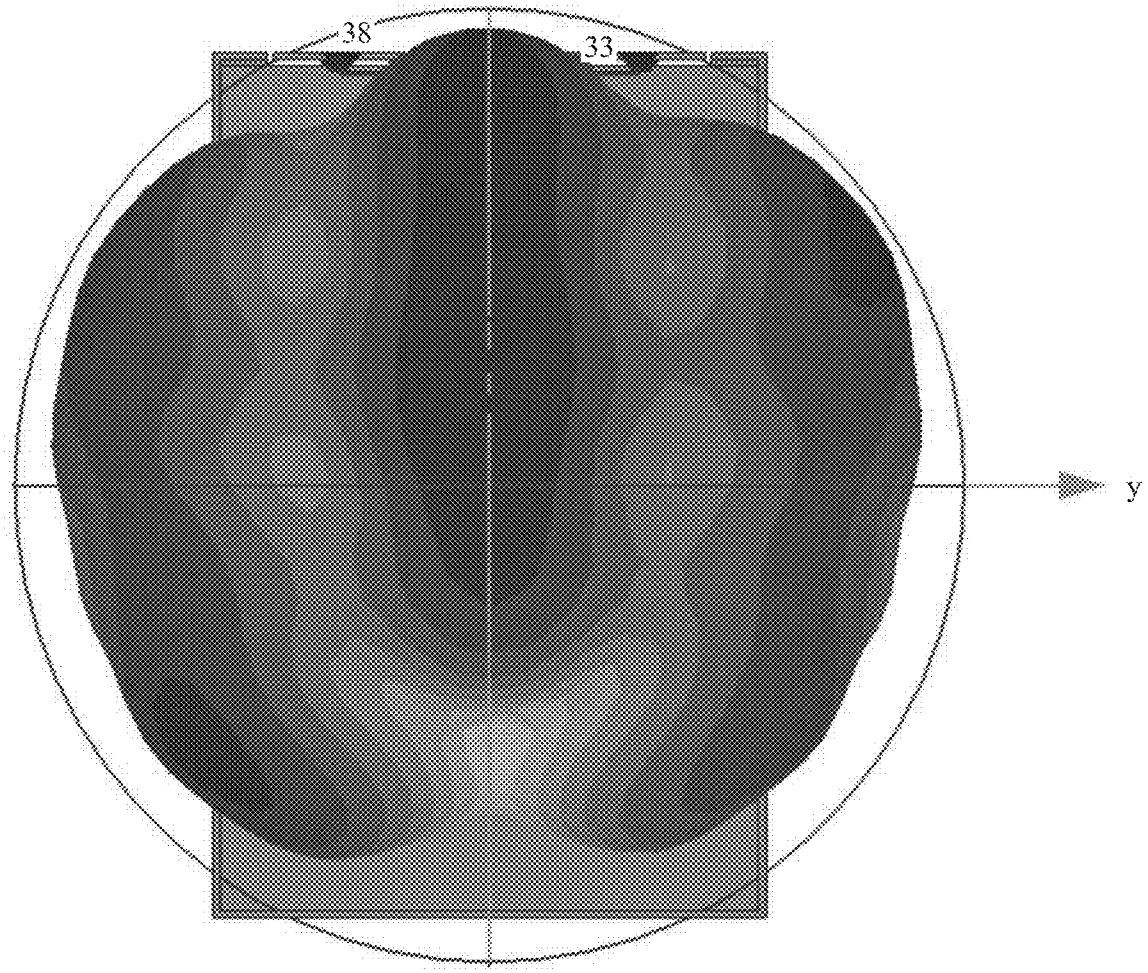
FIG. 12 is a radiation pattern of another Wi-Fi antenna of an electronic device according to Embodiment 4 of this application, where an operating frequency of the another Wi-Fi antenna is 2.45 GHz.
Figure 13:
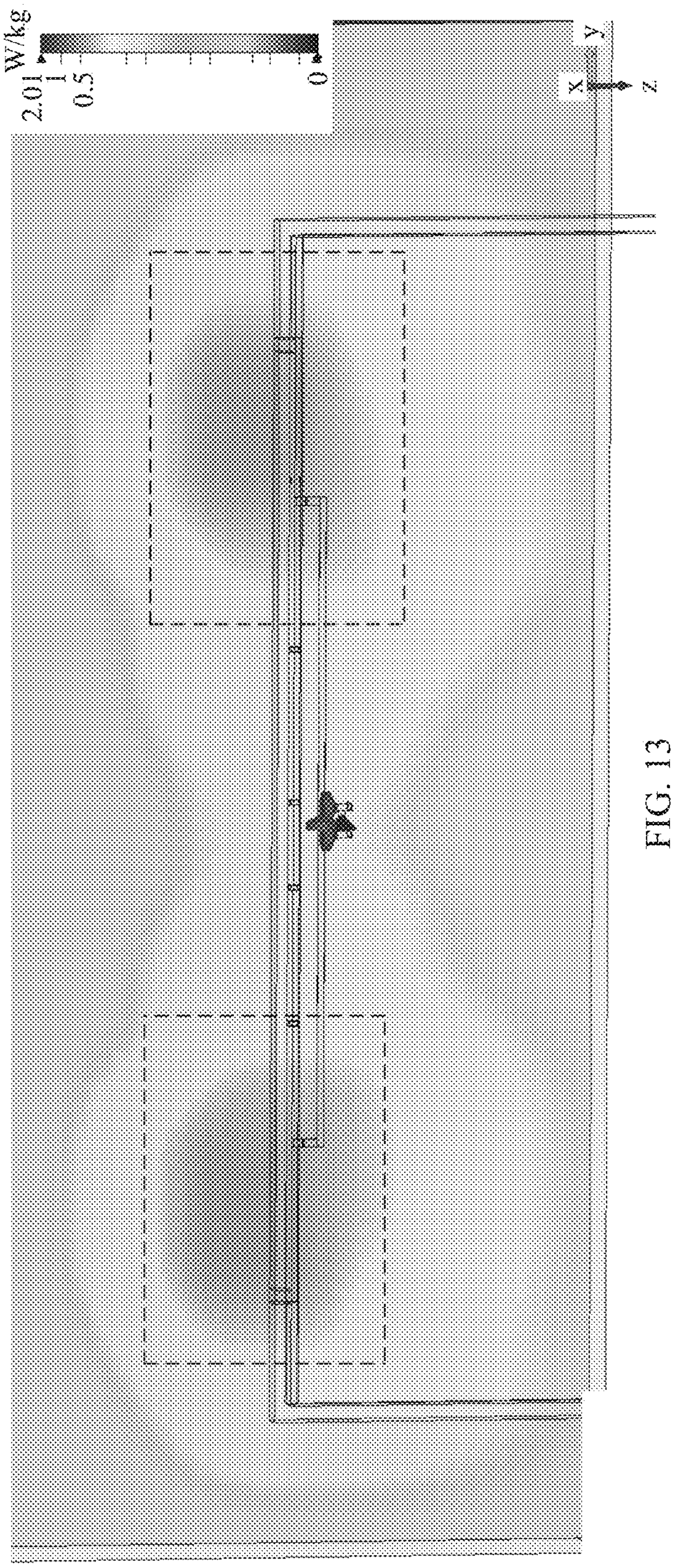
FIG. 13 is a simulation effect diagram of a SAR value of another Wi-Fi antenna of an electronic device according to Embodiment 4 of this application, where an operating frequency of the another Wi-Fi antenna is 2.45 GHz.

To verify directional performance and a SAR value characteristic of the low-frequency antenna, the Wi-Fi antenna, and the another Wi-Fi antenna in this embodiment of this application, full-wave electromagnetic simulation software HFSS is used to perform simulation analysis, so that simulation effect diagrams in FIG. 11 to FIG. 13 are obtained. In addition, the simulation effect is obtained when the low-frequency antenna works normally.

A simulation condition for obtaining the simulation effect diagrams shown in FIG. 11 to FIG. 13 is shown in Table 3 below (which is understood with reference to FIG. 10):

TABLE 3

| Parameter | Antenna system in Embodiment 4 of this application |
|---|---|
| Operating frequency of a low-frequency antenna | 0.83 GHz |
| Length L1 (mm) of a low-frequency antenna radiator | 90.36 |
| Length L2 (mm) of a first radiator section | 30.6 |
| Length L3 (mm) of a second radiator section | 30.6 |
| Distance d1 (mm) between a low-frequency antenna feed point and a center line of the low-frequency antenna radiator | 5 mm |
| Distance d2 (mm) between a low-frequency antenna ground point and a center line of the low-frequency antenna radiator | 5 mm |
| Distance d3 (mm) between a first high-frequency antenna feed point and a first high-frequency antenna ground point | 5 mm |
| Distance d4 (mm) between a second high-frequency antenna feed point and a second high-frequency antenna ground point | 5 mm |
| Gap s (mm) | 1.5 mm |

FIG. 11 is a simulation effect diagram of S parameters of a low-frequency antenna, a Wi-Fi antenna, and another Wi-Fi antenna of an electronic device according to Embodiment 4 of this application. In FIG. 11, a curve "S11-LB" represents a curve graph of a return loss of the low-frequency antenna changing with a frequency, a curve "S12" represents a curve graph of isolation between the low-frequency antenna and the Wi-Fi antenna changing with a frequency, a curve "S22-Wi-Fi 1 (CM)" represents a curve graph of a return loss of the Wi-Fi antenna changing with a frequency, CM represents a common mode, and is referred to as Common Mode in English. A curve "S23" represents a curve graph of isolation between two Wi-Fi antennas changing with a frequency, a curve "S33-Wi-Fi 2 (DM)" represents a curve graph of a return loss of another Wi-Fi antenna changing with a frequency, and DM represents a differential mode, and is referred to as Differential Mode in English.

It can be learned from FIG. 11 that the low-frequency antenna, the Wi-Fi antenna, and the another Wi-Fi antenna all have relatively good impedance matching. In addition, within a frequency range of 0.5 GHz to 2.5 GHz, isolation between the low-frequency antenna and the Wi-Fi antenna is basically greater than 10 dB, which can meet a normal operating requirement of the antenna. Isolation between the Wi-Fi antenna and another Wi-Fi antenna is better, and FIG. 11 shows only a part of a curve. In addition, isolation between the low-frequency antenna and the another Wi-Fi antenna is very high, which is not shown in FIG. 11. It can be learned from the foregoing that the low-frequency antenna, the Wi-Fi antenna, and the another Wi-Fi antenna may operate simultaneously.

FIG. 12 is a radiation pattern of another Wi-Fi antenna of an electronic device according to Embodiment 4 of this application, where an operating frequency of the another Wi-Fi antenna is 2.45 GHz. Refer to FIG. 12. A deeper gray scale indicates a higher field strength, and a part with a deepest grayscale indicates a highest field strength. It can be learned from FIG. 12 that radiation energy of the another Wi-Fi antenna in all directions of the electronic device is relatively uniform, and a directivity coefficient of the Wi-Fi antenna is reduced to 3.998 dBi. In other words, energy radiated in all directions of the Wi-Fi antenna is relatively uniform, and is not concentrated in an angle direction.

FIG. 13 is a simulation effect diagram of a SAR value of another Wi-Fi antenna of an electronic device according to Embodiment 4 of this application, where an operating frequency of the another Wi-Fi antenna is 2.45 GHz, Refer to FIG. 13. A deeper grayscale indicates a larger SAR value. A part shown in a dashed box in FIG. 13 represents a distribution status of simulation effects of SAR values at a first radiator section and a second radiator section of the another Wi-Fi antenna. It can be learned from FIG. 13 that the SAR value of the another Wi-Fi antenna can be reduced to 2 W/kg.

Obviously, a person skilled in the art can make various modifications and variations to this application without departing from the spirit and scope of this application. In this way, this application is intended to cover these modifications and variations provided that they fall within the scope of the following claims and their equivalent technologies.

What is claimed is:

1. An antenna system, comprising: a first antenna, wherein the first antenna comprises an antenna radiator, the antenna radiator is strip-shaped, the antenna radiator has a first antenna feed point and an antenna ground point that are spaced in a length direction of the antenna radiator, the first antenna feed point is connected to a first antenna radio frequency source to receive a first radio frequency signal output by the first antenna radio frequency source, and the antenna ground point is connected to a ground, wherein:

the antenna radiator has a first end and a second end, a first radiator section in which the first end is located and a second radiator section in which the second end is located being used as a radiator of a second antenna, the first radiator section has a second antenna feed point connected to a second antenna radio frequency source, a second radio frequency signal output by second antenna radio frequency source is received by using both the first radiator section and the second radiator section, and at least one of the first radiator section or the second radiator section being connected to the ground, wherein a first free end of the first radiator section and a second free end of the second radiator section are respectively the first end and the second end;

one of two first filters is connected between the first antenna radio frequency source and the first antenna feed point, the other one of the two first filters is connected between the ground and the antenna ground point, and the two first filters allow a signal of the first antenna to pass through, and prevent a signal of the second antenna from passing through; and one of two second filters is connected between the second antenna radio frequency source and the second antenna feed point, the other one of the two second filters is connected between the ground and at least one of the first radiator section or the second radiator section, and the two second filters allow the signal of the second antenna to pass through, and prevent the signal of the first antenna from passing through.

2. The antenna system according to claim 1, wherein at least one of the following occurs:

the first antenna is a low-frequency antenna, the first antenna radio frequency source is a low-frequency antenna radio frequency source, and the two first filters are low-pass filters; or the second antenna is a high-frequency antenna, the second antenna radio frequency source is a high-frequency antenna radio frequency source, and the two second filters are high-pass filters.

3. The antenna system according to claim 2, wherein:

the high-frequency antenna is a Wi-Fi antenna;

and the second radiator section has a high-frequency antenna ground point, and the high-frequency antenna ground point is connected to the ground by using one of the two second filters.

4. The antenna system according to claim 3, wherein the second antenna feed point is located at an end that is of the first radiator section and that is far away from the first end, and the high-frequency antenna ground point is located at an end that is of the second radiator section and that is far away from the second end.

5. The antenna system according to claim 3, wherein the high-frequency antenna ground point selects, by using a switch component, a branch of one of the high-pass filters that is connected to the ground and a branch of a high-pass filter connected to an output of another high-frequency antenna radio frequency source.

6. The antenna system according to claim 5, wherein the switch component is a single-pole double-throw switch.

7. The antenna system according to claim 2, wherein:

the high-frequency antenna is a Wi-Fi antenna;

the first radiator section has a first high-frequency antenna feed point and a first high-frequency antenna ground point, the first high-frequency antenna feed point is located between the first high-frequency antenna ground point and the first end, the first high-frequency antenna feed point is connected to an output of the high-frequency antenna radio frequency source by using one of the high-pass filters, and the first high-frequency antenna ground point is connected to the ground by using one of the high-pass filters; and the second radiator section has a second high-frequency antenna feed point and a second high-frequency antenna ground point, the second high-frequency antenna feed point is located between the second high-frequency antenna ground point and the second end, the second high-frequency antenna feed point is connected to a phase shifter by using one of the high-pass filters and connected to the output of the high-frequency antenna radio frequency source, and the second high-frequency antenna ground point is connected to the ground by using one of the high-pass filters.

8. The antenna system according to claim 7, wherein the first high-frequency antenna ground point is located at an end that is of the first radiator section and that is away from the first end, and the second high-frequency antenna ground point is located at an end that is of the second radiator section and that is away from the second end.

9. The antenna system according to claim 7, wherein the antenna system further comprises a differential circuit and another high-frequency antenna radio frequency source, two input ends of the differential circuit are respectively connected to the output of the high-frequency antenna radio frequency source and an output of another high-frequency antenna radio frequency source, an output end of the differential circuit is connected to a high-pass filter connected to the first high-frequency antenna feed point, and the output of the high-frequency antenna radio frequency source and the output of the another high-frequency antenna radio frequency source are both connected to the phase shifter.

10. The antenna system according to claim 7, wherein the first high-frequency antenna feed point and the high-frequency antenna radio frequency source are connected by using a first transmission line, and the second high-frequency antenna feed point and the high-frequency antenna radio frequency source are connected by using a second transmission line.

11. The antenna system according to claim 1, wherein the antenna radiator is straight strip-shaped.

12. The antenna system according to claim 1, wherein lengths of the first radiator section and the second radiator section are both a quarter of an operating wavelength of the second antenna.

13. The antenna system according to claim 1 wherein an operating frequency range of the first antenna does not overlap an operating frequency range of the second antenna.

14. The antenna system according to claim 13, wherein:

when the first antenna is a low-frequency antenna, an operating frequency band of the low-frequency antenna is 0.7 GHz to 0.96 GHz; and when the second antenna is a high-frequency antenna, an operating frequency band of the high-frequency antenna is 2.4 GHz to 2.5 GHz.

15. The antenna system according to claim 1, wherein in the length direction of the antenna radiator, the first antenna feed point is located between the antenna ground point and an end that is of the first radiator section and that is away from the first end.

16. The antenna system according to claim 1, wherein the first antenna feed point and the antenna ground point are located in a middle part of the antenna radiator, and both the first radiator section and the second radiator section are located outside the middle part.

17. The antenna system according to claim 16, wherein in the length direction of the antenna radiator, the first antenna feed point and the antenna ground point are respectively located on two sides of a center line of the antenna radiator.

18. An electronic device, wherein the electronic device comprises an antenna system comprising:

a first antenna, wherein the first antenna comprises an antenna radiator, the antenna radiator is strip-shaped, the antenna radiator has a first antenna feed point and an antenna ground point that are spaced in a length direction of the antenna radiator, the first antenna feed point is connected to a first antenna radio frequency source to receive a first radio frequency signal output by the first antenna radio frequency source, and the antenna ground point is connected to a ground, wherein:

the antenna radiator has a first end and a second end, a first radiator section in which the first end is located and a second radiator section in which the second end is located being used as a radiator of a second antenna, the first radiator section has a second antenna feed point connected to a second antenna radio frequency source, a second radio frequency signal output by the second antenna radio frequency source is received by using both the first radiator section and the second radiator section, and at least one of the first radiator section or the second radiator section being connected to the ground, wherein a first free end of the first radiator section and a second free end of the second radiator section are respectively the first end and the second end;

one of two first filters is connected between the first antenna radio frequency source and the first antenna feed point, the other one of the two first filters is connected between the ground and the antenna ground point, and the two first filters allow a signal of the first antenna to pass through, and prevent a signal of the second antenna from passing through; and one of two second filters is connected between the second antenna radio frequency source and the second antenna feed point, the other one of the two second filters is connected between the ground and at least one of the first radiator section or the second radiator section, and the two second filters allow the signal of the second antenna to pass through, and prevent the signal of the first antenna from passing through.

19. The electronic device according to claim 18, wherein:

the antenna radiator comprises an outer bezel of the electronic device; or the antenna radiator uses a strip-shaped patch structure, and the strip-shaped patch structure is attached to a surface of an outer bezel of the electronic device and is made of a conductive material.

20. The electronic device according to claim 18, wherein at least one of the following occurs:

the first antenna is a low-frequency antenna, the first antenna radio frequency source is a low-frequency antenna radio frequency source, and the two first filters are low-pass filters; or the second antenna is a high-frequency antenna, the second antenna radio frequency source is a high-frequency antenna radio frequency source, and the two second filters are high-pass filters.

* * * * *